US006871108B2

(12) United States Patent
Carlucci et al.

(10) Patent No.: US 6,871,108 B2
(45) Date of Patent: Mar. 22, 2005

(54) SYSTEM AND METHOD FOR CREATING A REPRESENTATION OF AN ASSEMBLY

(75) Inventors: Arthur C. Carlucci, Troy, MI (US); Vankatesh Kanneganti, Hyderabad (IN); Thomas W. Kelly, Royal Oak, MI (US); Chad Van Geenhoven, Royal Oak, MI (US)

(73) Assignees: QSSolutions, Inc., Royal Oak, MI (US); Purna Global Infotech, Ltd., Hyderabad (IN)

( * ) Notice: Subject to any disclaimer, the term of this patent is extended or adjusted under 35 U.S.C. 154(b) by 34 days.

(21) Appl. No.: 10/299,653

(22) Filed: Nov. 19, 2002

(65) Prior Publication Data

US 2004/0098151 A1 May 20, 2004

(51) Int. Cl.[7] .............................................. G06F 19/00
(52) U.S. Cl. ...................... 700/98; 700/103; 700/107; 703/1
(58) Field of Search ......................... 700/98, 103, 104, 700/106, 107; 703/1

(56) References Cited

U.S. PATENT DOCUMENTS

| 4,858,146 | A | | 8/1989 | Shebini | |
|---|---|---|---|---|---|
| 4,862,376 | A | * | 8/1989 | Ferriter et al. ............... | 700/107 |
| 4,885,694 | A | | 12/1989 | Pray et al. | |
| 4,912,657 | A | | 3/1990 | Saxton et al. | |
| 5,339,247 | A | * | 8/1994 | Kirihara et al. ............. | 700/106 |
| 5,781,447 | A | | 7/1998 | Gerdes | |
| 5,815,394 | A | * | 9/1998 | Adeli et al. .................... | 700/97 |
| 6,003,012 | A | * | 12/1999 | Nick ............................ | 705/10 |
| 6,058,262 | A | * | 5/2000 | Kawas et al. ................. | 703/13 |
| 6,088,625 | A | | 7/2000 | Kellstrom, Jr. | |
| 6,110,213 | A | | 8/2000 | Vinciarelli et al. | |
| 6,219,049 | B1 | | 4/2001 | Zuffante et al. | |
| 6,219,055 | B1 | | 4/2001 | Bhargava et al. | |
| 6,477,518 | B1 | * | 11/2002 | Li et al. ........................ | 706/45 |
| 6,810,401 | B1 | * | 10/2004 | Thompson et al. ......... | 707/101 |
| 2001/0037190 | A1 | | 11/2001 | Jung | |
| 2001/0044706 | A1 | * | 11/2001 | Yoshikawa et al. ............ | 703/1 |
| 2002/0012007 | A1 | | 1/2002 | Twigg | |
| 2002/0035463 | A1 | | 3/2002 | Lynch et al. | |
| 2002/0087440 | A1 | | 7/2002 | Blair et al. | |
| 2002/0107749 | A1 | * | 8/2002 | Leslie et al. .................. | 705/26 |
| 2003/0060913 | A1 | * | 3/2003 | Turner et al. ............... | 700/103 |
| 2003/0149500 | A1 | * | 8/2003 | Faruque et al. ............... | 700/97 |

FOREIGN PATENT DOCUMENTS

| EP | 0 304 864 A2 | 3/1989 |
|---|---|---|
| EP | 0 314 595 A2 | 5/1989 |
| EP | 0 314 595 A3 | 1/1991 |
| EP | 0 304 864 A3 | 3/1991 |
| EP | 0 304 864 B1 | 3/1995 |
| EP | 1 122 692 A2 | 8/2001 |

OTHER PUBLICATIONS

Patent Abstract of Japan, Application No. 2000151137 from http://www.delphion.com/cgi–bin/viewpat.cmd/JP21331535A2.
Patent Abstract of Japan, Application No. 2001028722 from file://C:/Documents%20and%Settings/lmw\Local%20Settings\Temp\JP2001282878%2 . . . .

* cited by examiner

Primary Examiner—Leo Picard
Assistant Examiner—Elliot L Frank
(74) Attorney, Agent, or Firm—Honigman Miller Schwartz & Cohn LLP

(57) ABSTRACT

Systems or methods for creating a finite element model from a list of component identifiers. For example, a CAD drawing could be automatically and dynamically created from a bill of material. Manufacturing instructions can be included into the model creation process. The bill of material need not specify the assembly being generated.

29 Claims, 20 Drawing Sheets

| face_name | description | offset | rotation |
|---|---|---|---|
| A | INSIDE LS | 0 | 0 |
| AX1 | WIRE HOLE(S) (LEAD SEAL) | 0 | 0 |
| AX2 | SET SCREW (125-104) | 0 | 0 |
| B | NOSE FACE | 0 | 0 |
| C | SCREW SEAT (SCREW OR THRUST WASHER) | 0 | 0 |
| D | NUT SEAT (OUTSIDE LOCKNUT OR PLUG) | 0 | 0 |
| E | TAMPER PROOF SEAT (YES IT CAN) | 0 | 0 |
| F | OUTSIDE LS | 0 | 0 |
| G | STOP SEAT | 0 | 0 |
| H | SPRING 1/LD/F OR DRILL POINT | 0 | 0 |
| I | SPRING 2/SD | 0 | 0 |
| J | LS, T-8A | 0 | 0 |
| K | SEATING SURFACE | 0 | 0 |
| L | WIRE STOP SURFACE | 0 | 0 |
| M | WIRE RETAINING GROOVE | 0 | 0 |
| OR1 | ABOVE THREAD | 0 | 0 |
| OR2 | 2 PORT BODY (3 PORT VALVE) | 0 | 0 |
| OR3 | 3 PORT BODY (4 PORT VALVE) | 0 | 0 |
| OR4 | ATMOS. VENT GROOVE | 0 | 0 |
| OR5 | INTERNAL (128-103, 128-024) | 0 | 0 |

Figure 12

| Configuration | T1 052 | T2 070 | T3 103 | T4 140 | |
|---|---|---|---|---|---|
| SC1  \| O \| | X | X | X | X | KEY |
| SC2  \| - \| O \| | X | X | X | X | I = Backup Ring |
| SC3  \| O \| I \| | X | X | X | X | O = O-ring |
| SC4  \| O \| | X | X | X | X | I = Glyd Ring |
| SC5  \| I \| O \| | X | X | | | X = Used |
| SC6  \| O \| I \| | X | X | | | |
| SC7  \| O \| I \| | | X | | | |
| SC8  \| O \| I \| O \| | | X | | | |
| SC9  \| I \| | | X | | | |
| SC10 \| - \| | | | | | |
| SC11 \| I \| I \| I \| | | | | | |
| SC12 \| O \| I \| | X | | | | |

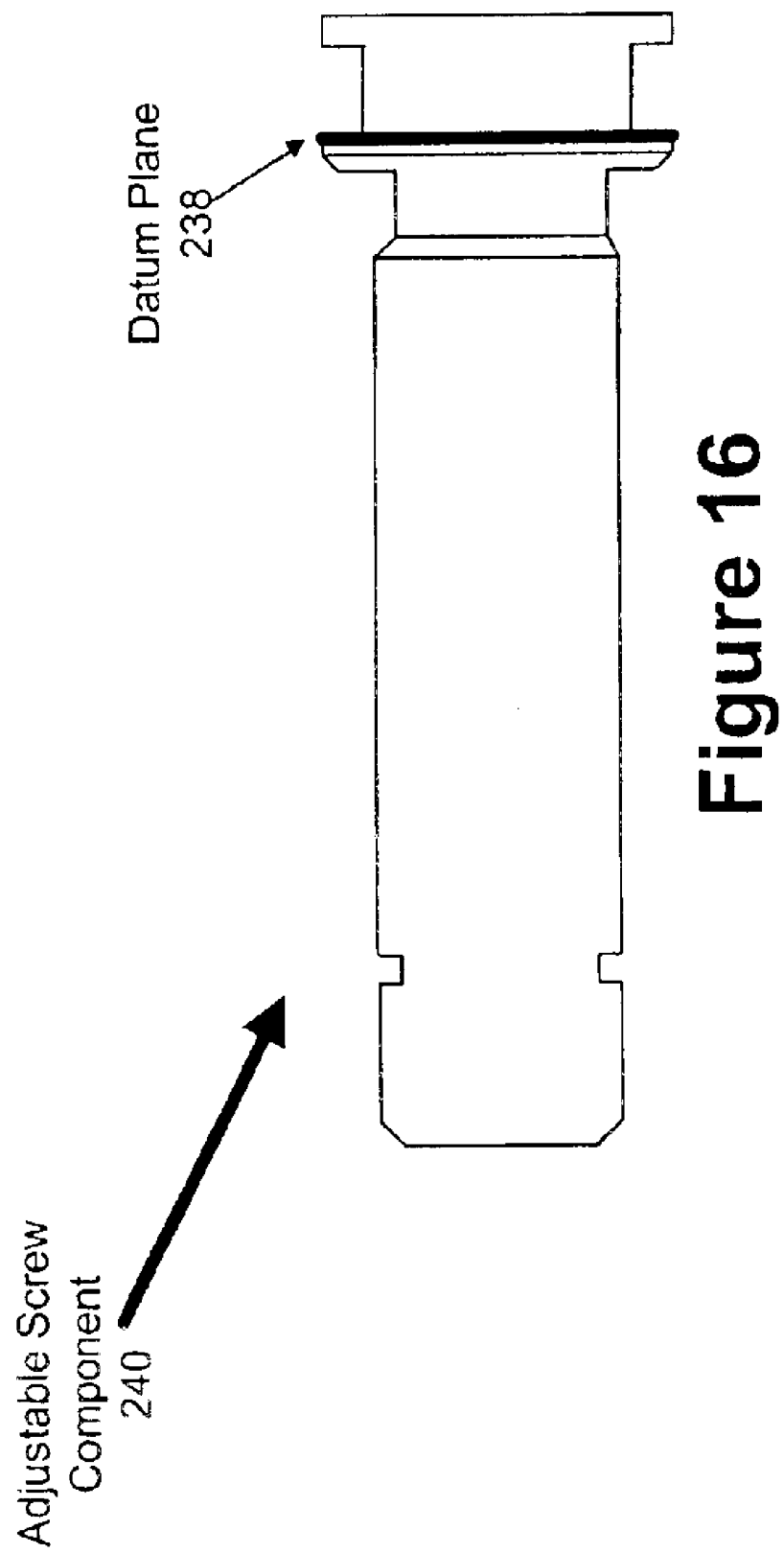

| | | |
|---|---|---|
| Face_Mate [241] | Fk_Face_Mate_Group_Face Gf_id1 | Group_Face [242] Gf_id |
| Face_Mate [241] | Fk_Face_Mate_Group_Face1 Gf_id2 | Group_Face [242] Gf_id |
| Part_Face [244] | Fk_Part_Face_Group_Face Gf_id | Group_Face [242] Gf_id |
| Part_Face [244] | Fk_Part_Face_Group_Part Gp_id | Group_Part [245] Gp_id |
| Group_Face [242] | Fk_Group_Face_Group1 Group_id | Group [243] Group_id |
| Group_Part [245] | Fk_Group_Part_Group1 Group_id | Group [243] Group_id |
| Wire_Mate [246] | Fk_Wire_Mate_Group_Part Gp_id_wire | Group_Part [245] Gp_id |

Figure 17b

| Table name: Group [241] | | |
|---|---|---|
| Column Name | Data Type | Description |
| Group_id | Int | Unique ID |
| Group_Name | Varchar | Group Name |
| Cartoon | Varchar | |
| Description | Varchar | |

| Table name: Group_Face [242] | | |
|---|---|---|
| Column Name | Data Type | Description |
| Gf_id | Int | Unique ID |
| Group_id | Int | Group_id <Group> |
| Face_Name | Varchar | Face Name |
| Description | Varchar | Description |
| Offset | Varchar | |
| Rotation | Varchar | |

| Table name: Group_Part [245] | | |
|---|---|---|
| Column Name | Data Type | Description |
| Gp_id | Int | Unique ID |
| Group_id | Int | Group_id <Group> |
| Part_no | Varchar | Part Number |
| Generic | Varchar | Generic Name Of Part |

| Table name: Part_Face [244] | | |
|---|---|---|
| Column Name | Data Type | Description |
| Id | Int | Unique ID |
| Gp_id | Int | Gp_id <Group_Part> |
| Gf_id | Int | Gf_id <Group_Face> |

| Table name: Part_Mate [241] | | |
|---|---|---|
| Column Name | Data Type | Description |
| Id | Int | Unique ID |
| GF_id1 | Int | Gf_id <Group_Face> |
| Gf_id2 | Int | Gf_id <Group_Face> |

| Table name: Wire_Mate [246] | | |
|---|---|---|
| Column Name | Data Type | Description |
| Id | Int | Unique ID |
| Gp_id_wire | Int | Gp_id <Group_Part> |
| Gp_id_body | Int | First 3 Characters of the part |

Figure 17c

| Part No. | Part Name |
|---|---|
| 126-601-011 | Hex Body |
| -126-601-010 | |
| --126-601 | |
| 230-178 | Sleeve |
| 230-238 | Sleeve |
| 240-184 | Piston |
| 250-145 | Retainer |
| 250-225 | Retainer |
| 400-002-002 | Ring Wire |
| 400-002-007 | Wire Ring |
| 515-002-015 | Backup Ring |
| 515-002-016 | Backup Ring |
| 515-002-017 | Backup Ring |
| 515-002-018 | Backup Ring |
| 515-052-479 | Backup Ring |
| 525-003-009 | Backup Ring |
| 530-002-008 | Glyd Ring |
| 530-102-011 | Glyd Ring |
| 530-102-013 | Glyd Ring |
| 600-234 | Spring |
| A220-018 | Sub-assembly |
| -220-018 | Ball End |
| -800-001-040 | Lockwire |

| Part No. | Part Name |
|---|---|
| Controls | |
| 270-005 | Cap |
| 325-059 | Adjustment Screw |
| 350-003 | Locknut |
| 400-001-005 | Stop Ring |
| 500-001-012 | O-Ring |
| 515-002-012 | Backup Ring |
| Adjustment Range | |
| 240-162 | Piston |
| 250-143 | Retainer |
| 260-059 | Seat |
| 460-005 | Washer |
| 500-001-007 | O-Ring |
| 530-001-005 | Glyd Ring |
| 600-232 | Spring |
| 600-233 | Spring |
| Seals | |
| 500-001-007 | O-Ring |
| 500-001-009 | O-Ring |
| 500-001-010 | O-Ring |
| 500-001-012 | O-Ring |
| 500-001-018 | O-Ring |
| 500-001-503 | O-Ring |
| 500-002-015 | O-Ring |
| 500-002-017 | O-Ring |

Subassembly callouts 260

Bill of Materials 124

Figure 18

```xml
<?xml version="1.0" ?>
- 
- <model name="CWCL" cartridge="CGN">
- <part partno="126-601-011" partname="Hex Body" qty="1" usedon="commonpart">
- <subpart type="makefrom" partno="126-601-010" partname="Hex Body">
  <subpart type="makefrom" partno="126-601" partname="Hex Body"/>
  </subpart>
  </part>
  <part partno="230-178" partname="Sleeve" qty="1" usedon="commonpart"/>
  <part partno="230-238" partname="Sleeve" qty="1" usedon="commonpart"/>
  <part partno="240-162" partname="Piston" qty="1" usedon="range"/>
  <part partno="240-184" partname="Piston" qty="1" usedon="commonpart"/>
  <part partno="250-143" partname="Retainer" qty="1" usedon="range"/>
  <part partno="250-145" partname="Retainer" qty="1" usedon="commonpart"/>
  <part partno="250-225" partname="Retainer" qty="1" usedon="commonpart"/>
  <part partno="260-059" partname="Seal" qty="1" usedon="range"/>
  <part partno="270-005" partname="Cap" qty="1" usedon="control"/>
  <part partno="325-059" partname="Adjustment Screw" qty="1" usedon="control"/>
  <part partno="350-003" partname="Locknut" qty="1" usedon="control"/>
  <part partno="400-001-005" partname="Stop Ring" qty="1" usedon="control"/>
  <part partno="400-002-002" partname="Ring Wire" qty="1" usedon="commonpart"/>
  <part partno="400-002-007" partname="Wire Ring" qty="1" usedon="commonpart"/>
  <part partno="460-005" partname="Washer" qty="1" usedon="range"/>
  <part partno="500-001-007" partname="O-Ring" qty="1" usedon="range"/>
  <part partno="500-001-007" partname="O-Ring" qty="1" usedon="seal"/>
  <part partno="500-001-009" partname="O-Ring" qty="1" usedon="seal"/>
  <part partno="500-001-010" partname="O-Ring" qty="1" usedon="seal"/>
  <part partno="500-001-012" partname="O-Ring" qty="1" usedon="control"/>
  <part partno="500-001-012" partname="O-Ring" qty="1" usedon="seal"/>
  <part partno="500-001-018" partname="O-Ring" qty="1" usedon="seal"/>
  <part partno="500-001-503" partname="O-Ring" qty="2" usedon="seal"/>
  <part partno="500-002-015" partname="O-Ring" qty="1" usedon="seal"/>
  <part partno="500-002-017" partname="O-Ring" qty="2" usedon="seal"/>
  <part partno="515-002-012" partname="Backup Ring" qty="1" usedon="control"/>
  <part partno="515-002-015" partname="Backup Ring" qty="1" usedon="commonpart"/>
  <part partno="515-002-016" partname="Backup Ring" qty="1" usedon="commonpart"/>
  <part partno="515-002-017" partname="Backup Ring" qty="2" usedon="commonpart"/>
  <part partno="515-002-018" partname="Backup Ring" qty="1" usedon="commonpart"/>
  <part partno="515-052-479" partname="Backup Ring" qty="3" usedon="commonpart"/>
  <part partno="525-003-009" partname="Backup Ring" qty="1" usedon="commonpart"/>
  <part partno="530-001-006" partname="Glyd Ring" qty="1" usedon="range"/>
  <part partno="530-002-008" partname="Glyd Ring" qty="1" usedon="commonpart"/>
  <part partno="530-102-011" partname="Glyd Ring" qty="1" usedon="commonpart"/>
  <part partno="530-102-013" partname="Glyd Ring" qty="1" usedon="commonpart"/>
  <part partno="600-232" partname="Spring" qty="1" usedon="range"/>
  <part partno="600-233" partname="Spring" qty="1" usedon="range"/>
  <part partno="600-234" partname="Spring" qty="1" usedon="commonpart"/>
- <part partno="A220-018" partname="Sub-assembly" qty="2" usedon="commonpart">
  <subpart type="sub" partno="220-018" partname="Ball End" qty="1"/>
  <subpart type="sub" partno="800-001-040" partname="Lockwire" qty="1"/>
  </part>
  </model>

```xml
<model name="RPEC" cartridge="LAV">
<part partno="126-200-011" partname="Body" qty="1" usedon="control" />
<part partno="220-008" partname="Ball End" qty="1" usedon="range" />
<part partno="260-015" partname="Seat" qty="1" usedon="range" />
<part partno="280-010-003" partname="Orifice" qty="1" usedon="commonpart" />
<part partno="325-031-001" partname="Adjustment Screw" qty="1" usedon="control" />
<part partno="350-003" partname="Locknut" qty="1" usedon="control" />
<part partno="400-001-005" partname="Stop Ring" qty="1" usedon="range" />
<part partno="400-002-002" partname="Ring Wire" qty="1" usedon="commonpart" />
<part partno="500-101-012" partname="O-Ring" qty="1" usedon="control" />
<part partno="500-102-015" partname="O-Ring" qty="1" usedon="seal" />
<part partno="500-102-017" partname="O-Ring" qty="1" usedon="seal" />
<part partno="500-102-501" partname="O-Ring" qty="1" usedon="seal" />
<part partno="515-102-015" partname="Backup Ring" qty="1" usedon="seal" />
<part partno="515-102-016" partname="Backup Ring" qty="1" usedon="seal" />
<part partno="525-001-012" partname="Backup Ring" qty="1" usedon="control" />
<part partno="600-041" partname="Spring" qty="1" usedon="range" />
<part partno="600-048" partname="Pilot Spring" qty="1" usedon="range" />
<part partno="A220-005" partname="Sub-assembly" qty="1" usedon="range" />
<part partno="A230-026" partname="Sub-assembly" qty="1" usedon="range">
  <subpart partno="230-026" partname="Sleeve" qty="1" />
  <subpart partno="240-024" partname="Piston" qty="1" />
  <subpart partno="A280-022" partname="Sub-assembly" qty="1">
    <subpart partno="280-022-001" partname="Orifice" qty="1" />
    <subpart partno="700-003" partname="Unknown" qty="1" />
  </subpart>
</part>
</model>
```

Figure 20

SYSTEM AND METHOD FOR CREATING A REPRESENTATION OF AN ASSEMBLY

BACKGROUND OF INVENTION

The invention relates generally to tools and techniques for creating a representation of an assembly. More specifically, the invention relates to a system and method (collectively "drawing system" or simply the "system") for automatically creating a drawing, model or other representation (collectively "representation") of an assembly from a list of components, such as parts and/or subassemblies.

The use of Computer Aided Design ("CAD") techniques and other design tools (collectively "CAD tools") is widespread. Engineers in a wide variety of different manufacturing and other industries utilize CAD tools to design assemblies. Product designs of assemblies are typically generated using CAD tools, regardless of whether the assembly is an airplane, an automobile, a dishwasher, industrial equipment, or any other type of engineered or manufactured product. When it is necessary for design information to be exchanged between employees in the same company, or between employees of different companies, such as between a supplier and an original equipment manufacturer ("OEM") or other manufacturer, the design is often in the form of a CAD drawing or some other form of electronic or virtual representation or model (collectively "CAD drawing").

Despite the importance of CAD drawings, effective tools do not exist to create new CAD drawings for new designs. Engineers, designers, and draft persons (collectively "designers") are often literally forced to reinvent the wheel. Reinventing the wheel is an inefficient use of time, money, and expertise. The best existing technique for creating a CAD drawing in a rapid and yet accurate manner requires the finding of similar CAD drawing, and using that drawing as a starting point for the new CAD drawing. Such a technique becomes increasingly ineffective as the assemblies increase in complexity. Moreover, two assemblies that are similar with respect to function, can be made of significantly different component parts and subassemblies or can even incorporate vastly different internal structures. Furthermore, such a process is not automated, requiring the designer to locate a suitable template, and then go about the process of building the alternative design.

It would be desirable for a system to facilitate the creation of an assembly representation from a list of components. However, the prior art does not disclose such a system. To the extent that the existing art even seeks,to address the need for an automated drawing system, those existing approaches embrace a top-down "template-based" approach rather than a bottom-up "component-based" approach. Thus, the prior art affirmatively teaches away from the system and method disclosed below.

SUMMARY OF INVENTION

The invention is a system or method (collectively the "drawing system" or simply the "system") for automatically creating a drawing, or some other form of electronic or virtual representation or model (collectively "CAD drawing" or "drawing") of an assembly from a list of component parts.

The system can use a list of components, an assembly hierarchy of components, and a grouping hierarchy of components, to automatically create a drawing of an assembly.

The system can be implemented through various combinations of subsystems. An input subsystem can be configured to receive a list of components. A grouping subsystem can be used to organize components into a group of components sharing a common mating characteristic and other characteristics. A mating subsystem can be used to create a connection between two or more components utilizing a characteristic relating to the one or more groups of components.

The system can also be configured to automatically create a drawing of an assembly from a bill of materials and a database of components.

BRIEF DESCRIPTION OF DRAWINGS

The embodiments of the automated drawing system and method (collectively "drawing system" or simply "system") will be described in detail, with reference to the following figures, wherein:

FIG. 12 is a table of characteristics illustrating some examples of characteristics shared by all components in a particular group of components.

FIG. 14 is a configuration matrix illustrating an example of o-ring configurations and characteristics that can be incorporated into the system.

FIG. 16 is a component diagram illustrating an example of a datum plane that can be identified as the component characteristic of a face.

FIG. 17b is data relationship chart illustrating some examples of relationships between some of the various database tables.

FIG. 17c is chart illustrating some examples of database tables and table definitions that can be incorporated into the system.

FIG. 18 is an example of bill of material that could be used by the system to automatically generate an assembly.

FIG. 19 is an XML example of a BOM that can be pulled from the database with a stored procedure such as an up_proe procedure.

FIG. 20 is an XML example of a BOM that can be pulled from the database with a stored procedure such as an up_proe procedure.

DETAILED DESCRIPTION OF THE EMBODIMENTS

1. Introduction of Elements

Figure 1:
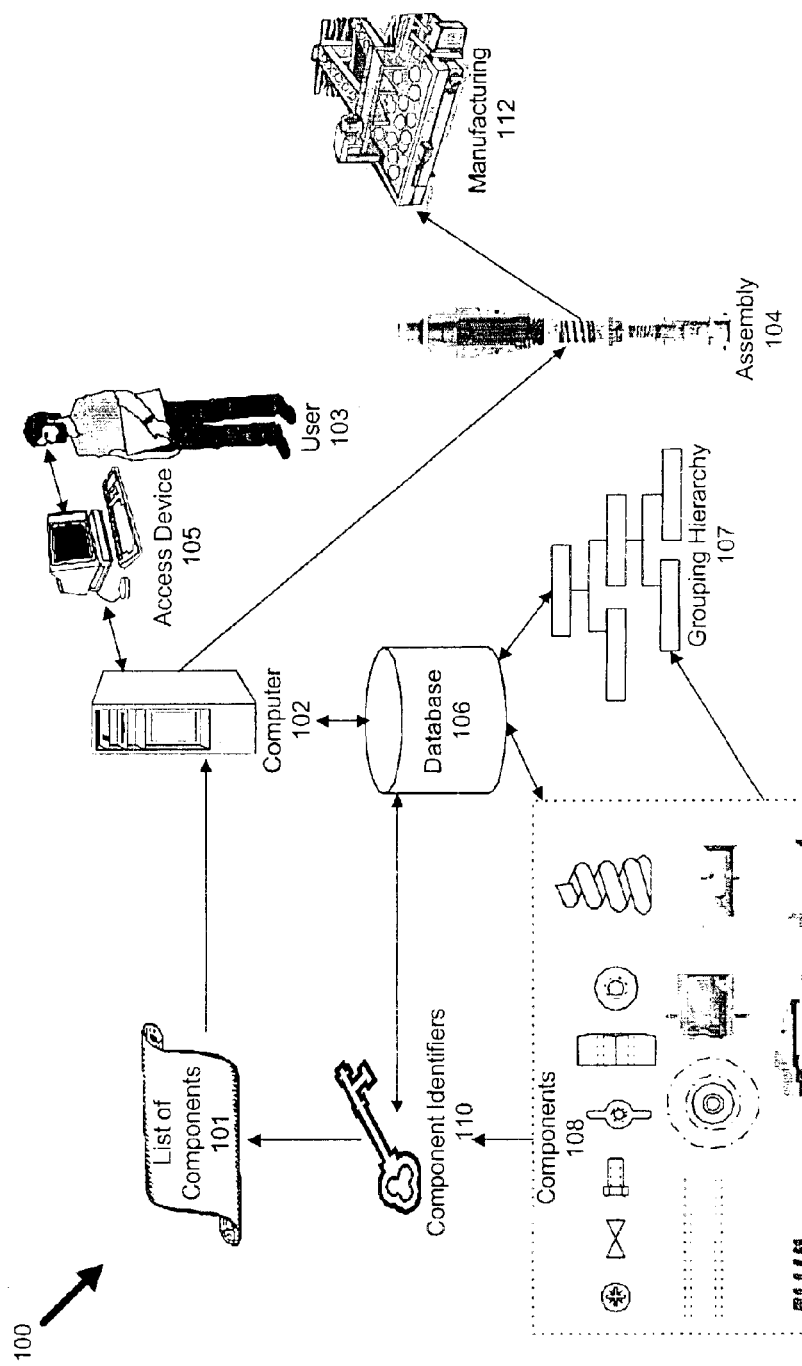
FIG. 1 is block diagram illustrating an example of some of the elements that can be incorporated into the system.

FIG. 1 is a block diagram illustrating an example of some of the elements that can be incorporated into a system and method (collectively the "drawing system" or simply the "system") 100 for creating a drawing, model, or other form of representation (collectively a "drawing") of an assembly 104. The system 100 can create a drawing of the assembly 104 from a list of components 101, such as a bill of material. Unless otherwise specifically designated as "physical" or "manufactured" structures, all references to components, parts, subassemblies, assemblies, component groups, and other structures (collectively "structures") refer to drawings of such structures, and not the "physical" structure represented by the drawing. Similarly, any reference to a characteristic of a structure refers to a characteristic of the structure as represented in the system 100, unless the structure is specifically designated as a "physical" or "manufactured" structure.

In a preferred embodiment of the system 100, structure representations are in the format of a CAD drawing. Alternative embodiments may utilize drawings or other forms of representations that are not CAD drawings and/or lists of components 101 that are not in the form of a bill of materials 124.

A. Components and Component Characteristics

The fundamental building blocks of an assembly 104 can be the components 108 that will ultimately be used to make the assembly 104. Components 108 can include both parts (components 108 that are not broken down into simpler structural elements) and subassemblies (components 108 that can be broken down into simpler structural elements such as other subassemblies and parts). Virtually any type of structure can be a component 108. Components 108 can include connectors such as springs, bolts, screws, nuts, nails, and other forms of connectors. Components 108 can also include a wide variety of non-connector structures such as a steel bar, circuit board, two-by-four piece of wood, o-ring, piston, hex-body, and any other structure.

Components 108 possess certain characteristics that define the identity or attributes of the component 108. Component characteristics can include any attribute relating to the component 108, such as a name, function, material composition, finite element, shape, face, color, weight, height, width, length, deviation tolerance, or some other attribute. Some of those characteristics influence how a component 108 can be combined (e.g. mated) with other components 108, such as mating characteristics. A connection between two components 108 requires compatible mating characteristics on the part of both components 108. Other types of component characteristics do not relate to mating, and thus not all component characteristics are mating characteristics. For example, the color of a component 108 has no impact on how a component 108 mates, but it is still an attribute of the component 108.

B. Components Groups and Grouping Hierarchies

Components 108 can be organized into component groups ("groups") that are made up of other components 108 with similar component characteristics. Groups can themselves be organized into groups with other groups, forming a hierarchy of groups (a "grouping hierarchy") 107. Groups are defined by shared component characteristics ("group characteristics"), which can include characteristics that are relevant for mating purposes.

Some embodiments of the system 20 can include a relatively flat or horizontal grouping hierarchy 107, with relatively few high level abstract groups. Other embodiments can include a relatively deep or vertical grouping hierarchy 107. The nature and complexity of the assembly 104 will have a lot to do with the appropriate design of the grouping hierarchy 107.

C. List of Components

The input to the system 100 for creating the assembly 104 is a list of components 101. In some embodiments, the list of components 101 can include the components 108 themselves. For example, the list of components could include not only a label identifying the components 108, but also the CAD representations of the components 108. In other embodiments, the list of components 101 can be a bill of material with a component identifier 110 for each item on the bill of material. In a preferred embodiment, the list of components 101 is a pre-validated bill of material, a bill of material that is known to include all of the components 108 needed to construct the assembly 104. In some alternative embodiments, the bill of material is not pre-validated at the time the bill of material is created, but instead, is validated by the system 100 after it is received by the system 100. In some alternative embodiments, the list of components 101 is not a bill of material and does not include the actual component representations. The list of components 101 can utilize a wide variety of different component identifiers 110. In many embodiments, the components 108 in the list of components 101 are already stored in the database 106, and the system 100 requires only the component identifier 110.

Components 108 such as parts and subassemblies, are defined in some respect in the context of the assembly 104 being created. For example to some entities, the assembly 104 is an automobile, so an instrument panel would be a mere subassembly. For entities involved in supplying instrument panels, the instrument panel would be the assembly 104, and its various components would then be parts and subassemblies. Thus, the system 100 is capable of being utilized in a highly flexible and adaptable manner, as configured by the user 103 in accordance to the needs of the organization using the system 100.

D. Component Identifiers

A component identifier 110 is potentially any identifier in a list of components 101 that would allow the system 100 to identify and access the designs of components 108 listed in the list of components 101. The component identifier 109 can be any identifier allowing the system 100 to identify the components 108 and their characteristics as stored in a database 106 using the component identifier 110 in the list of components 101. In many embodiments involving a relational database, human users 103 and the system 100 utilize different unique keys, so that human user 103 can use meaningful naming and labeling conventions.

E. Database

A database 106 can be used for a wide variety of different functions by the system 100. In embodiments of the system 100 where the list of components 101 does not include the components 108 themselves, the database 106 is necessary for storing the library of components 108 and the component identifier 110 for each component 108 stored in the database 108. The database 106 can also be used to store group hierarchies 107 and assembly hierarchies, as described below.

In some embodiments, the system 100 incorporates the functionality of a CAD tool such as a finite element analyzer within the confines of the system 100. In other embodiments, the system 100 interfaces with a CAD tool, such as a finite element analyzer. If the database 106 is not directly accessible for the CAD tool or finite element analyzer, there should be some mechanism for communicating data between the database 106 and whatever data storage mechanism is used by the CAD tool or finite element analyzer.

A wide variety of different databases 106 can be used by the system 100. Relational databases, object-oriented databases, binary databases, and data storage techniques using flat files, arrays, and other data structures can be incorporated into the system 100.

F. Computer

A computer 102 is any device that can house the processing logic and/or software needed by the system 100 in order for the system 100 to function. The computer 102 can be used by the system 100 to receive the list of components 101 and to access the database 106. In a preferred embodiment, the computer 102 is a server capable of being accessed by several client computers. In alternative embodiments, the computer can be any configuration of computational network or device, including but not limited to desktop computers, laptop computers, wireless hand held devices, cell phones, personal digital assistants (PDAs), mainframe computers, work stations, local area networks, wide area networks, devices capable of accessing the Internet, devices capable of accessing an intranet, devices capable of accessing an extranet, and other devices and peripherals that can support those devices.

G. Users and Access Devices

In many embodiments, a user 103 accesses the system 100 through an access device 105. In some of those embodiments, the computer 102 and the access device 105 are the same device, such as a work station or desktop computer. In many embodiments, the user 103 is a human being. In alternative embodiments, the user 103 can be a computation device such as a computer, a robot, an expert system, or a device embedded with artificial intelligence. In some alternative embodiments, the computer 102, the access device 105, and the user 103 can be the same device. If the user 103 is a computer 102, it can be a wide range of computers, as discussed above with respect to the computer 102. Similarly, access devices 105 can be a wide range of computational and communication devices as discussed above with respect to the computer 102.

H. Assembly

The assembly 104 is potentially any structure that is made up of components 108 as parts and subassemblies. The composition of an assembly 104 can be defined in an assembly hierarchy, as described below.

Assemblies 104 are defined through the system 100 by users 103, in accordance with the goals and concerns of entities and organizations relating to the user 103. For example, an airplane manufacturer may define the entire airplane as an assembly 104, while a jet engine manufacturer would not be concerned with components 108 outside of the engine, and thus could define the engine as the assembly 104 instead of the entire plane. Just as the grouping hierarchies 107 described above can be primarily horizontal or primarily vertical, the composition of a particular assembly 104 can also be relatively deep or relatively flat. An assembly hierarchy is described in greater detail below.

I. Manufacturing

The ultimate utility of an assembly 104 is the ability to manufacture a physical assembly. A manufacturing subsystem or module 112 can be used to receive manufacturing instructions generated by the system 100 as part of the process of generating the assembly 104. In some embodiments, the manufacturing subsystem 112 can be configured to automatically manufacture the physical assembly using the assembly 104 and manufacturing instructions relating to the assembly 104. A wide variety of automated tools can be incorporated into the manufacturing processes performed by the manufacturing subsystem 112. In some embodiments, a robot can be used to both create the assembly 104 in an electronic or other representative format, and then manufacture the physical assembly based on the generated representation.

II. Assembly Hierarchy

Figure 2:
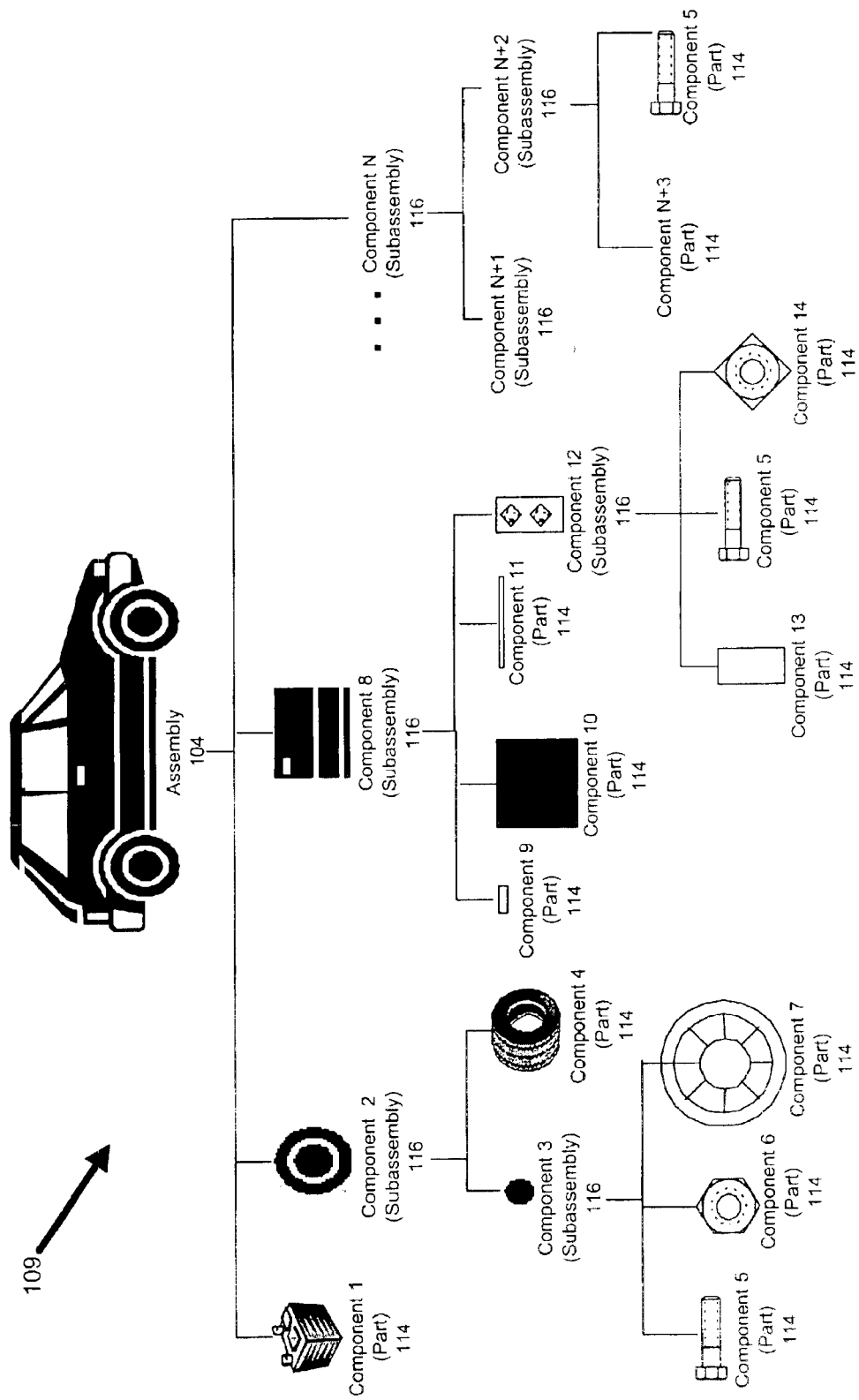
FIG. 2 is a hierarchy diagram illustrating an example of an assembly hierarchy diagram that includes several component parts and subassemblies.

FIG. 2 is a hierarchy diagram illustrating an example of an assembly hierarchy 109 that includes several components 108, including parts 114 and subassemblies 116.

The system 100 creates assemblies 104, and can potentially provide assembly instructions as well as manufacture physical assemblies, by building up from the various parts 114 and subassemblies 116 that make the assembly 104. As discussed above, the structural unit of the assembly 104 is determined by the goals of the user 103 or the user's organization. The assembly hierarchy 109 then breaks down the various components 108 into less abstract and more detailed units such as parts 114 or less abstract subassemblies 116. Just the goals and practices of the user 103 affect the highest level on the assembly hierarchy 109, the goals and practices of the user 103 also affect how deep the assembly hierarchy 109 needs to be. For example, a company that simply assembles large subassemblies into finished products may not need to break down the various subassemblies to the level of the composition of a bolt or screw. In contrast, a company responsible for building airplanes from low-level commercially available components will likely require a very large and deep assembly hierarchy 109.

In the example in FIG. 2, the assembly 104 is an automobile. The first level down in the hierarchy includes a car battery part 114 (component 1), a structural unit that an automobile manufacturer would not need to break down into simpler components 108 unless that same entity also manufactured batteries. In contrast, component 2 is a wheel subassembly 116, which can be broken down into a hub cap subassembly 116 (component 3) and a tire part 114 (component 4). The hub cap subassembly 116 (component 3) is made up of various part components 114 (components 5, 6, and 7). The tire part (component 114) need not be reduced further because it is purchased by the manufacturer from a supplier in the form of a tire.

The automobile assembly 104 also includes a door subassembly 116 (component 8). Such a subassembly 116 can include a door handle part 114 (component 9), the metal door frame part 114 (component 10), a door lining part 114 (component 11), and a hinge subassembly 116 (component 12) made up of various parts 114 (components 13, 5, and 14).

An automobile assembly 104 is comprised of far more components 108 than can be illustrated in FIG. 2. The potentially unlimited number of components 108 is indicated by the reference to the subassembly 116 labeled component N, which is itself comprised of subassemblies 116 (component N+1 and N+2). Component N+2 is itself a subassembly 116 made up of component N+3 and component 5.

As illustrated in the example, a particular component 108 can find itself being used in different subassemblies 116. For example, component 5 (part 114) is incorporated into component 3, component 12, and component N+2. Similarly, a particular subassembly 116 can be incorporated into several different subassemblies 116 and/or assemblies 104.

The exact structure of the example in FIG. 2 is for illustration purposes only. Users 103 can create their own assembly hierarchies 109 in a way that maximizes the benefits to the system 100 for that user 103. Some embodiments of the system 100 will incorporate very deep assembly hierarchies 109. Other embodiments will incorporate relatively flat assembly hierarchies 109. The goals of the user 103 and the complexity of the assemblies 104 will ultimately shape the design of the assembly hierarchy 109.

In a preferred embodiment of the system 100, object-oriented design techniques are incorporated into the design of the assembly hierarchy 109.

III. Group Hierarchy

Figure 3:
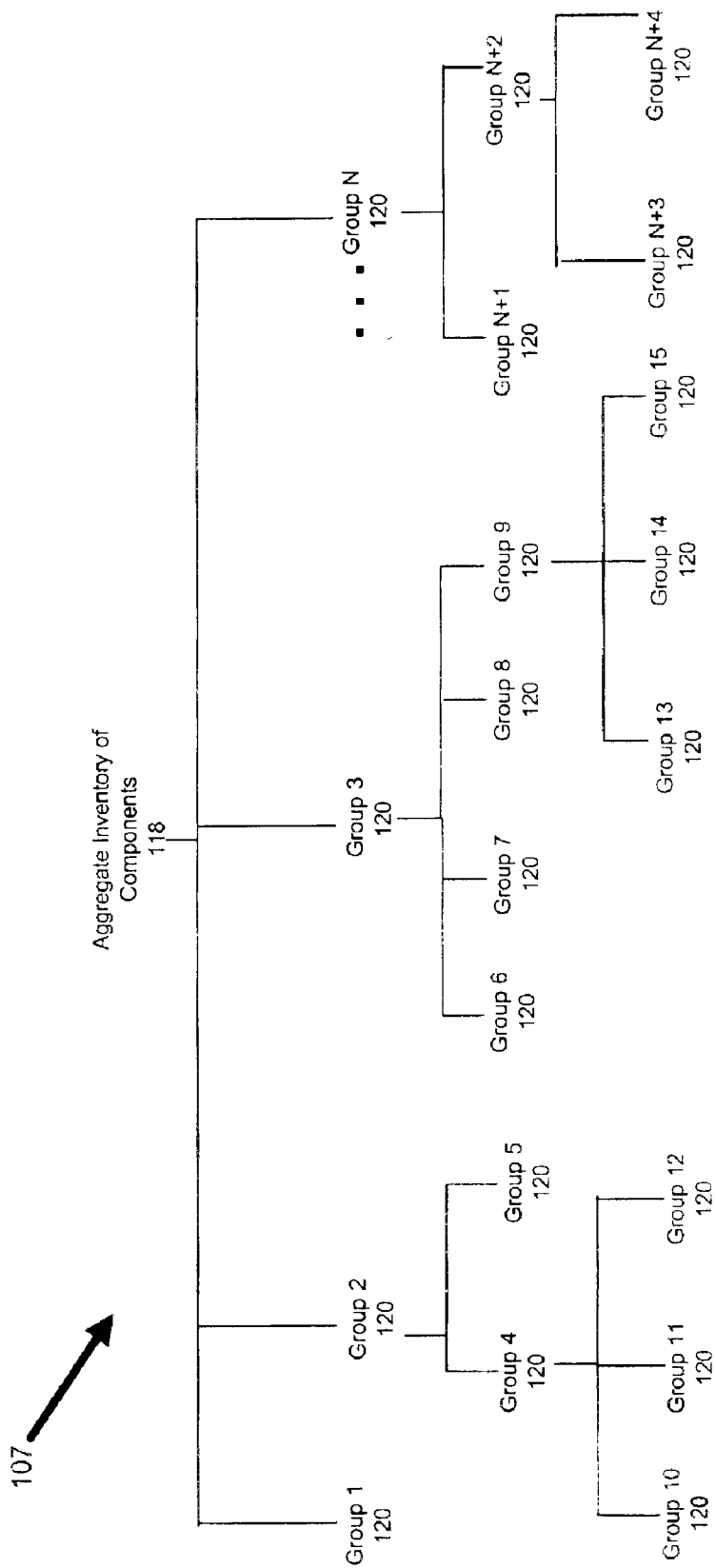
FIG. 3 is a hierarchy diagram illustrating an example of a grouping hierarchy that includes several levels of component groups.

FIG. 3 is a block diagram illustrating an example of a grouping hierarchy 107 that includes several levels of component groups 120. Just as assembly hierarchies 109 will vary significantly from embodiment to embodiment and user 103 to user 103, group hierarchies 107 will also vary considerably. The system 100 can support a wide variety of different groups and different group hierarchies 107.

An aggregate inventory of components 118 can be divided into one more groups 120. In some embodiments, the aggregate inventory is itself a group 120, a group which includes all components 108 in the system 100. The shared characteristic of such a large group may simply be existence within the system 100.

Groups 120 can be defined by the shared component characteristics of the components 108 in the various groups 120. Such shared characteristics can relate to the way in which parts 114 and subassemblies 116 can mate with other components 108, or relate to non-mating characteristics of the components 108. Groups 120 can share some characteristics with other groups 120, and thus a hierarchy of groups 120 can be incorporated into the system 100.

Just as screws, nails, and bolts, are all forms of connectors, there are differences between screws, nails, and bolts that distinguish them from each other. Similarly, there are different types of screws, and one type of screw will have some characteristics that differ depending on the type of screw.

In the example illustrated in FIG. 3, group 1 has no child groups. Group 2 includes group 4 and group 5, with group 4 being made up of groups 10, 11, and 12. Similarly group 3 is made up of groups 6, 7, 8, and 9, with group 9 being made up of groups 13, 14, and 15.

The potentially unlimited number of groups 120 is emphasized by the reference to group N, which includes group N+1 and group N+2, with group N+2 being made up of groups N+3 and N+4. In some embodiments, it is possible for a single group 120 to descend from more than one parent group 120.

In a preferred embodiment, object-oriented design techniques are incorporated into the design of the group hierarchy 107. Groups 120 at the bottom of the diagram in FIG. 3, i.e. groups 120 that are not themselves made up of other groups, can be referred to as "building block groups" because such groups 120 will likely be the most useful with respect to mating characteristics and other component characteristics relating to the generation of the assembly. 104. Groups 120 defined in a more abstract way, higher on the group hierarchy can be referred to as "high level groups" and may be based on the existence of a single shared characteristic that is highly abstract.

IV. Inputs to the System

Figure 4:
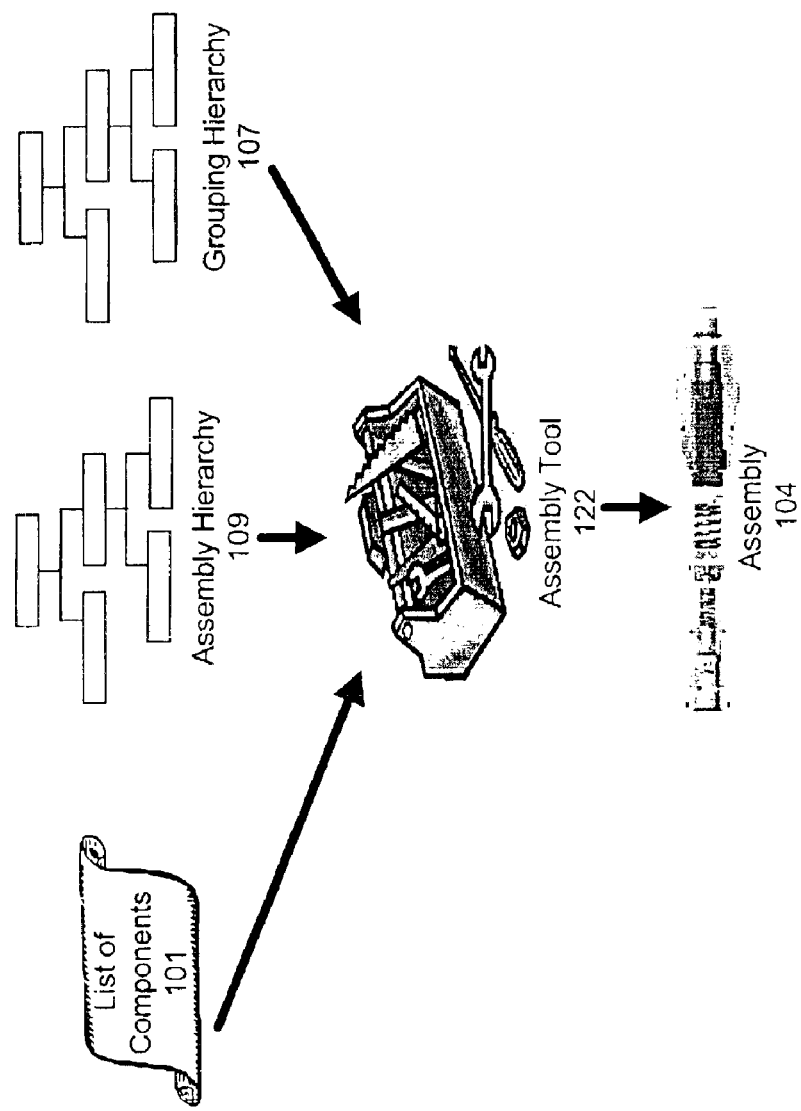
FIG. 4 is a process flow diagram illustrating one example of the type of inputs that can be used by an assembly tool.

FIG. 4 is a process flow diagram illustrating one example of the type of inputs that can be used by an assembly tool 122 used by the system 100. The inputs for the assembly tool 122 can be the list of components 101, the assembly hierarchy 109, and the grouping hierarchy 107. If in such a configuration, the list of components 101 does not include the actual components 108, then a database 106 of components 108 and component identifiers 109 can also be used. In some embodiments utilizing a bill of material, the database 106 can be used to create a pre-validated bill of material before the assembly process begins.

The assembly hierarchy 109 and grouping hierarchy 107 are built within the system 100, and can be reused for many different component lists 101. The efficiency of the system 100 can be dependent upon the appropriateness of the design of the assembly hierarchy 108 and grouping hierarchy 107. Both hierarchies should be designed with a realistic scope of what is a "black box" for the system 100 and what needs to be broken down into more detailed elements. If the system 100 is to create widely different assemblies 104, such as an automobile and a kitchen table, different grouping hierarchies 107 should be used.

The assembly tool 122 is the computer program, logic, algorithm, method, process, or other mechanism for actually generating the assembly 104 from the list of components 101. In some embodiments, the assembly tool 122 includes a CAD tool or some other finite element analyzer. In other embodiments, the assembly tool 122 interfaces with a CAD tool or finite element analyzer. The assembly tool 122 can also be referred to as a mating tool.

Figure 5:
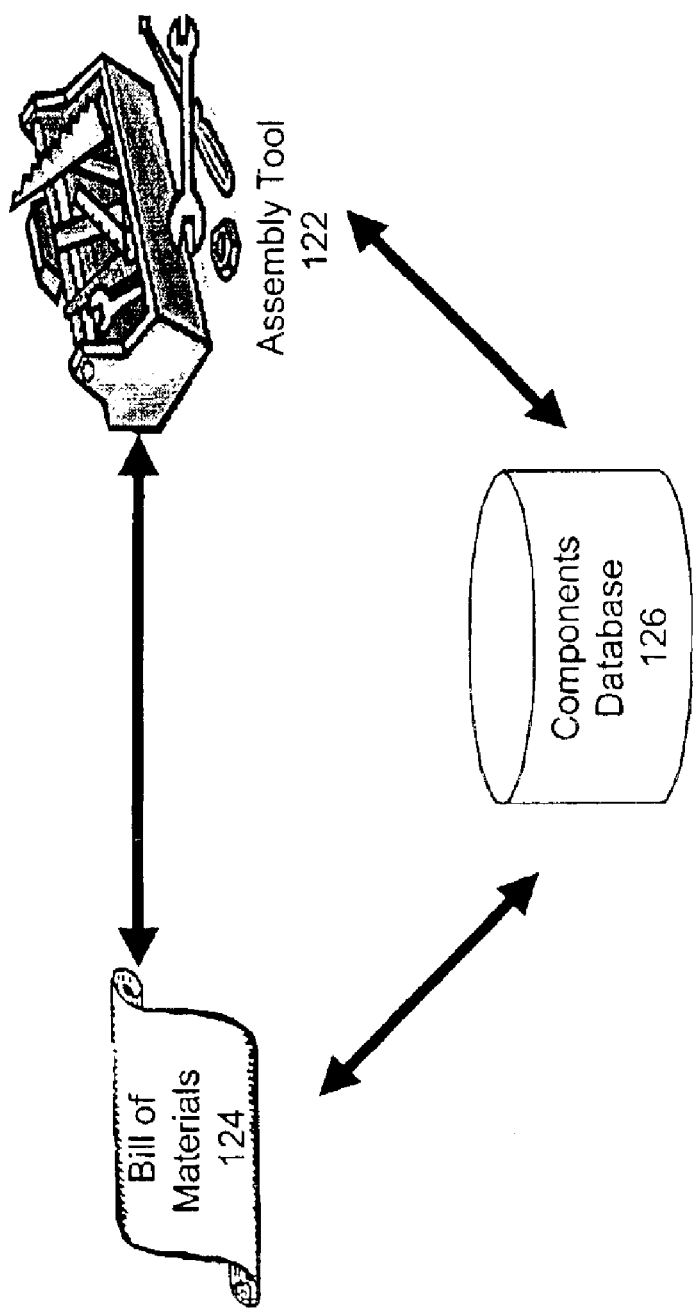
FIG. 5 is process flow diagram illustrating one example of an assembly tool interacting with a bill of materials and a components database to automatically build a drawing of an assembly.

FIG. 5 is block diagram illustrating one example of an assembly tool 122 interacting with a bill of materials 124 and a components database 126 to automatically build a drawing of the assembly 104. In this view, the logic provided by the grouping hierarchy107 and assembly hierarchy 109 can be incorporated into the components database 126. The bill of materials 124 can be embedded with some or all of the relevant group hierarchy 107 for the purposes of identifying mating locations in a prompt and accurate manner. The system 100 is highly flexible and adaptable, capable of storing and processing the various different hierarchies in a wide variety of different ways.

V. Subsystem-Level Views

A. Subsystem Configuration Number One

Figure 6:
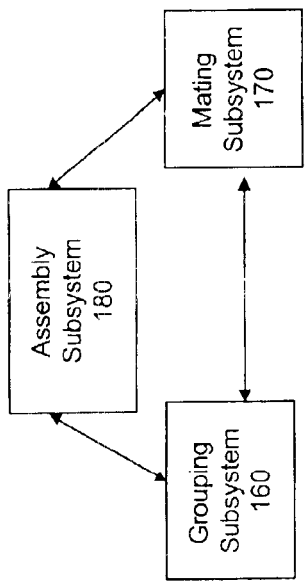
FIG. 6 is a process flow diagram illustration of one example of a subsystem-level view of the system that includes an input subsystem, a grouping subsystem, and a mating subsystem.

FIG. 6 is a process flow diagram illustrating one example of a subsystem-level view of the system 100 that includes an input subsystem 130, a grouping subsystem 160, and a mating subsystem 170. The input subsystem 130 can be configured to receive the list of components 101 and identify the components 108 making up the assembly 104. The grouping subsystem 160 can include various categories of components 108, such as the "component groups" 120 discussed above, that are defined based on common component characteristics shared by the components 108 in the group 120. The grouping subsystem 160 can be configured so that each component 108 belongs to at least one group 120. The grouping subsystem 160 can also be configured so that each component belongs to only one building block group 120. The mating subsystem 170 can be used to create a connection between two or more components 108. Mating determinations relating to a particular component 108 can be determined by characteristics relating to the group 120 of the component 108 and the group 120 of the component 108 being mated to.

The list of components 101 can be a pre-validated bill of material 124 as discussed above. The assembly 104 created by the mating subsystem 170 can include a potentially unlimited number of components 108, including many different subassemblies 116 that are themselves made up of subassemblies 116 and parts 114.

In some embodiments of the mating subsystem 170, there is only one potentially compatible mating connection for a particular component 108. In other embodiments, there can be multiple permissible mating connections for a particular component 108. In embodiments involving multiple permissible mating connections, the system 100 can use embedded intelligence, expert systems, and predetermined evaluation rules to selectively identify the particular alternative connection from numerous alternative connections, or the user 103 can evaluate the various alternatives in a manual fashion. Alternative connections can be identified or generated by the system 100 using component 108 and/or group 120 characteristics.

The mating subsystem 170 can include a mating heuristic that includes an assembly mating heuristic (an assembly rule) and a subassembly mating heuristic (a subassembly rule). The various mating heuristics can be used to determine the sequence in which components 108 are mated with each other. Such heuristics can be set by the user 103 or the system 100, to mate components 108 in a particular way or a particular order. For example, in a preferred embodiment, spring connections are generated after non-spring connections. Similarly, connections to make subassemblies near the bottom of the assembly hierarchy 109 should be implemented before connections among subassemblies near the top of the assembly hierarchy 109.

The mating subsystem 170 can generate a connection between two or more parts 114 to make a subassembly 116 using a subassembly rule. Two or more subassemblies 116 can be connected to make an assembly in accordance with an assembly rule. The mating subsystem 170 can include a diameter checking heuristic, for instances where mating compatibility may exist, but where such compatibility is subject to the diameter constraints of one or more components 108.

The mating subsystem 170 can be responsible for actually constructing the assembly 104 or the representation of the assembly 104, although that function can also be said to be performed by a drawing subsystem or a drawing module within the mating subsystem 170.

B. Subsystem Configuration Number Two

The system 100 is highly flexible and adaptable. Thus, the subsystems used by the system 100 to implement its processing can vary widely from embodiment to embodiment.

Figure 7:
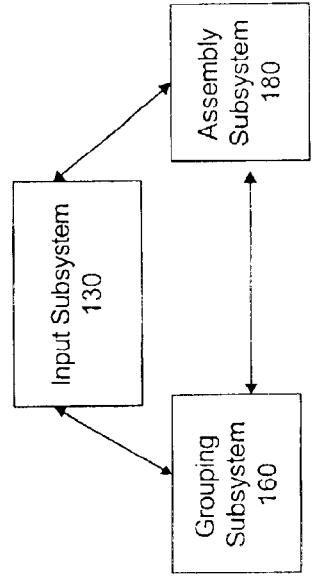
FIG. 7 is a process flow diagram illustration of one example of a subsystem-level view of the system that includes an assembly subsystem, a grouping subsystem, and a mating subsystem.

FIG. 7 is a process flow diagram illustrating one example of a subsystem-level view of the system 100 that includes an assembly subsystem 180, a grouping subsystem 160, and a mating subsystem 170. The mating subsystem 170 can be used to add, update, delete, and maintain mating compatibilities. The grouping subsystem 160 can be used to manage and update the group hierarchy 107. The assembly subsystem 180 can be used to actually connect parts 114 and subassemblies 116 together to build the assembly 104. Subsystem functions discussed above can be performed by the subsystems disclosed in FIG. 7.

C. Subsystem Configuration Number Three.

Figure 8:
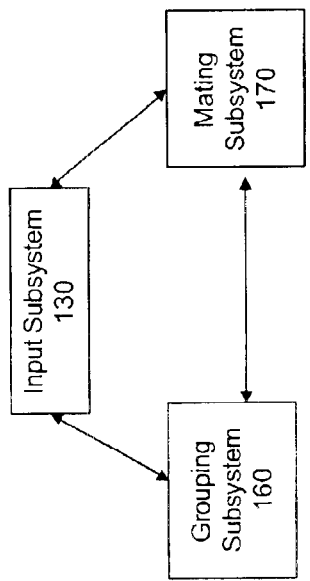
FIG. 8 is a process flow diagram illustration of one example of a subsystem-level view of the system that includes an assembly subsystem, a grouping subsystem, and a component subsystem.

FIG. 8 is a process flow diagram illustrating one example of a subsystem-level view of the system that includes an assembly subsystem 180, a grouping subsystem 160, and a component subsystem 190. The grouping subsystem 160 can be used to organize the components 108 maintained by the components subsystem 190 into groups 120. The assembly subsystem 180 can store all mating characteristics, and can provide for receipt of the list of components 101. Subsystem functions discussed above can be performed by the subsystems disclosed in FIG. 8.

D. Subsystem Configuration Number Four

Figure 9:
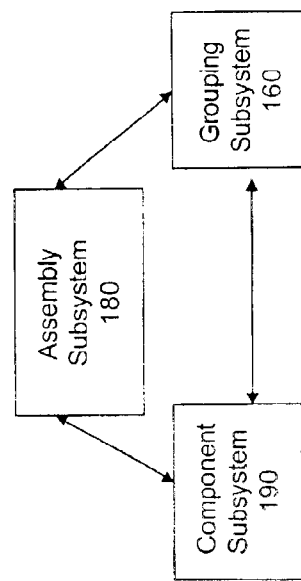
FIG. 9 is a process flow diagram illustration of one example of a subsystem-level view of the system that includes an assembly subsystem, a grouping subsystem, and an input subsystem.

FIG. 9 is a process flow diagram illustrating one example of a subsystem-level view of the system 100 that includes an assembly subsystem 180, a grouping subsystem 160, and an input subsystem 130. The input subsystem 130 can be configured to receive the list of components 101. The grouping subsystem 160 can be configured to organize the components 108 into groups 120, based in part of the mating characteristics of the various components 108. The assembly subsystem 180 can mate components 108 using the mating compatibilities that can be group-based. The assembly subsystem 180 can include creation, maintenance, and application of the assembly hierarchy 109. Subsystem functions discussed above can be performed by the subsystems disclosed in FIG. 9.

E. Subsystem Configuration Five

Figure 10:
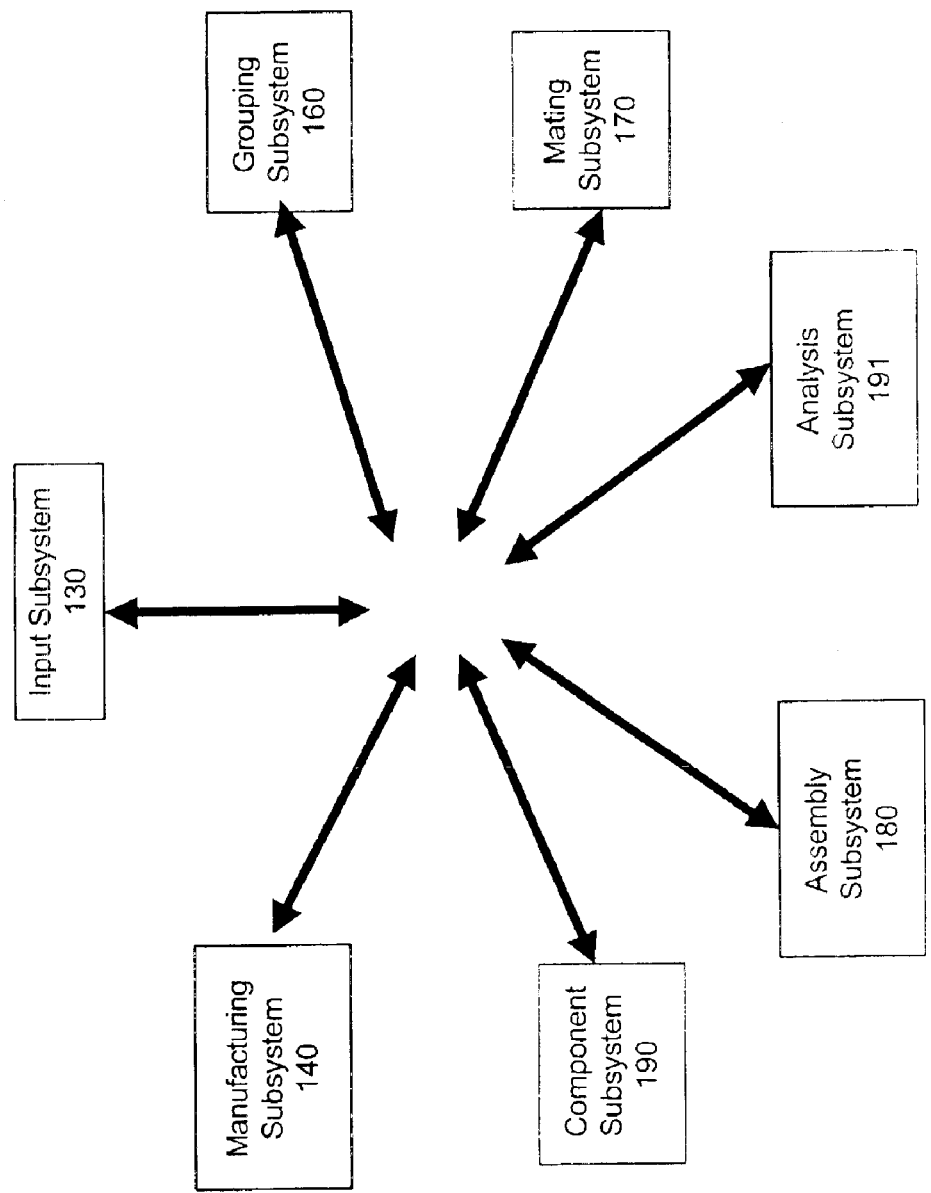
FIG. 10 is a process flow diagram illustration of a subsystem-level view of the system that includes an input subsystem, a manufacturing subsystem, an assembly subsystem, an analysis subsystem, a mating subsystem, and a grouping subsystem.

FIG. 10 is a process flow diagram illustrating an example of subsystem-level view of the system 100 that includes an input subsystem 130, a manufacturing subsystem 140, an assembly subsystem 180, an analysis subsystem 190, a mating subsystem 170, and a grouping subsystem 160.

In the embodiment illustrated in FIG. 10, the input subsystem 130 can be configured to receive the list of components 101 to be included in the assembly 104. The input subsystem 130 can also be used to create pre-validated bills of material 124 by interacting with the components database 126 in a component subsystem 190. This process is described in greater detail below. The components database 126 can be part of the overall system database 106, or a separate database with the ability to easily communicate with the overall system database 106.

The manufacturing subsystem 140 as described above, can be used to provide manufacturing instructions (which can also be referred to as assembly instructions) to physically manufacture the assembly 104. In some embodiments, the manufacturing subsystem 140 can automatically manufacture the physical assembly 104 without human intervention, by using the assembly 104 and the assembly instructions as inputs. Assembly instructions can be set to relate to individual component characteristics such as mating locations, component characteristics in the context of the mating component characteristics, group characteristics, or group characteristics in the context of the mating group characteristics.

The component subsystem 190 can be used to create, store, update, and maintain a library of components 108 and component characteristics. Every attribute potentially relevant to a structure such as a part 114, subassembly 116, component 108, or group 120 can be defined, implemented, and maintained through the component subsystem 190.

The assembly subsystem 180 can be used to create the assembly 104 using the mating characteristics maintained by the mating subsystem 170. The assembly subsystem 180 may gather manufacturing instructions at the time that the assembly 104 is created in the system 100.

The analysis subsystem 191 can be used to analyze alternative assemblies 104 based on predetermined criteria, user 103 selections, or by embedded intelligence in the system 100 using an expert system, artificial intelligence, neural networks, a statistically analysis, or some similar intelligence technology (collectively "intelligence"). Intelligence can be used to define select criteria, defined weighted criteria, and evaluate the results of the criteria. Different types of assemblies 104 will likely require different criteria for evaluating alternatives using the analysis subsystem 191.

The mating subsystem 170 can be used to maintain all potential mating compatibilities between various components 108. All mating heuristics and rules can also be created, updated, deleted, or otherwise maintained using the mating subsystem 170. For example, mating sequence rules defining the order that connections are to be applied are controlled through the mating subsystem 170.

The grouping subsystem 160 can be used to maintain all component groups 120 and a group hierarchy 107 upon which mating characteristics can be based. The grouping hierarchy 107 is discussed above. By allowing the user 103 to define component groups 120 in a flexible and highly adaptable manner, each organization can tailor the functioning of the system 100 to their particular business needs. An airline manufacturer should not use the same group hierarchy 107 as a turbine manufacturer or a maker of office furniture.

VI. Component Characteristics and Relationships

A. Component Characteristics

To set up a relationship between various components 108, such as parts 114 and subassemblies 116, important characteristics of the components 108 must be identified. This is preferably done by a human being user 103, but can also be achieved through automated means using technologies such as expert systems and artificial intelligence. An object-oriented design approach for designing software systems can be applied to the identification, organization, and characterization of component characteristics.

The types of characteristics that are identified can differ widely in different embodiments, consistent with the perspective of the user 103 and the types of assemblies 104 of interest to the user 103. For example, a manufacturer or office furniture may identify different characteristics for a hinge than a manufacturer of military cargo trucks. Some component characteristics are mating characteristics, characteristics that impact how a component 108 can "mate" with other components 108. Other component characteristics can be totally unrelated to mating, and are useful with respect to finite element analysis or some other analysis function.

Figure 11:
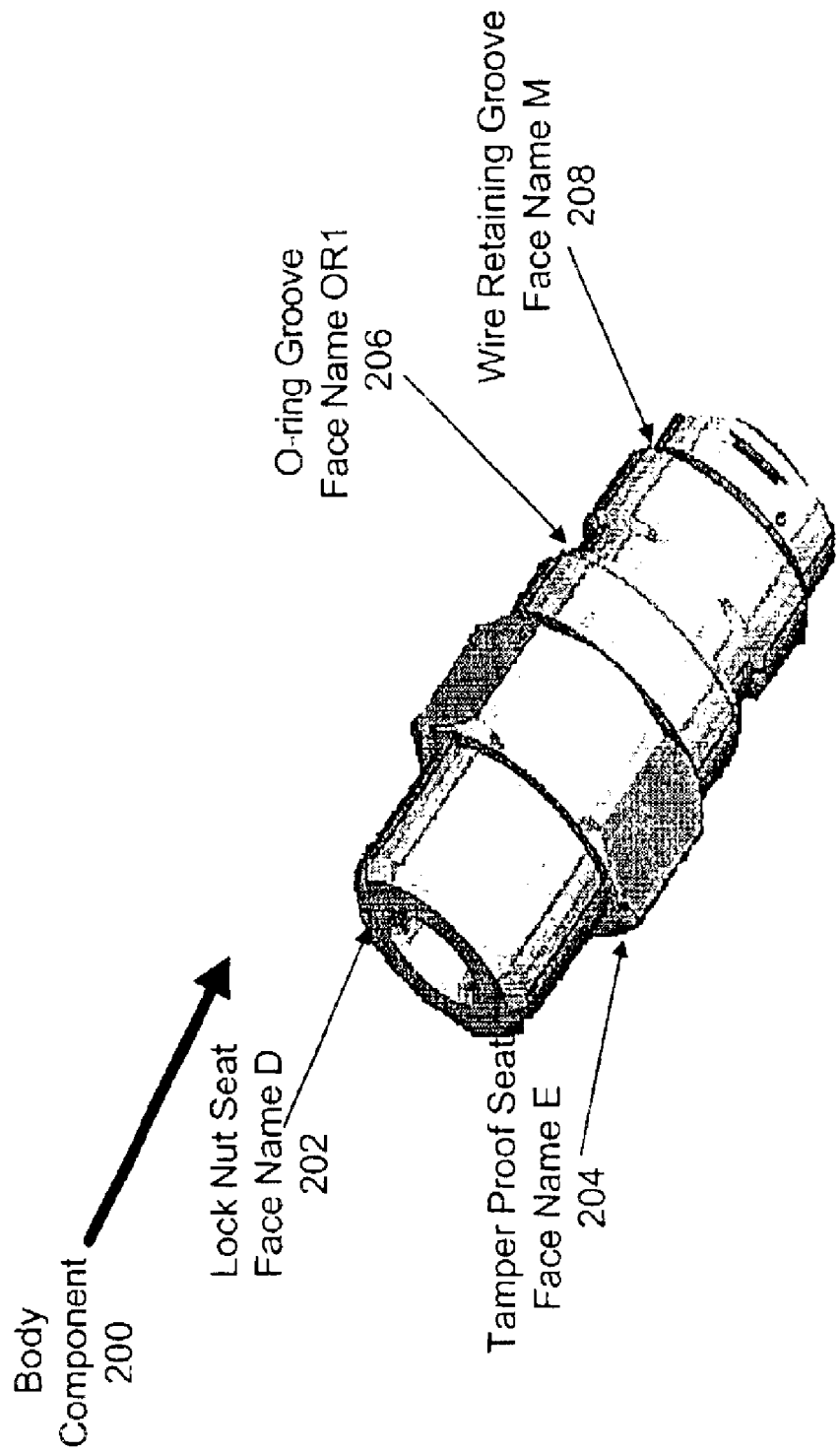
FIG. 11 is a component diagram illustrating an example of certain component characteristics.

FIG. 11 is drawing illustrating an example of a body component 200, and certain characteristics relating to the body component 200. For illustration purposes, there are four component characteristics identified in FIG. 11. However, other characteristics could be identified from the body component 200 in the figure. The four characteristics in the example are: a lock nut seat 202 with a face name of D; a tamper proof seat 204 with a face name of E; an O-ring groove 206 with a face name of OR1; and a wire retaining groove 208 with a face name of M. As described below, face names are one way in which the system 100 can identify and label relevant mating characteristics.

There can be N possible internal and external mating locations for a part 114, with N being a number as low as 1 and high as desired. There can be X different parts 114 capable of mating a particular part 114, with X being a number as low as 1 and as high as desired. In some embodiments, N and X can be as low as zero. There can be Y possible sizes for a particular part 114, with Y being a number as low as 1 and as high as desired. That can translate into potentially $N*X*Y$ relationships relating to a series of components 108.

Rather than having to associate each component 108 to another component 108 and/or each version of a component 108 to another version of component 108, all components 108, including parts 114, can be placed into component groups 120 in the hierarchy of groups 107. Each group 120 in the hierarchy of groups 107 can be thought of as a "bucket" of similar components 108. Some groups 120 that are on the lowest level in the hierarchy of groups 120 ("building block groups") and can be comprised of various parts 114 with identical mating characteristics, differing solely with respect to size. In some embodiments of the system 100, the only groups 120 in the system 100 are building block groups 120. With respect to mating components 108 together, the building block groups 120 are typically the most important and the most useful. However, building block groups 120 can be grouped together with other groups 120, and those groups 120 can be grouped together with other groups 120 of building block groups 120, as illustrated in the hierarchy of groups 107 disclosed in FIG. 3. Groups 120 near the top of the group hierarchy 107 disclosed in FIG. 3 ("high level groups") will typically share fewer and fewer characteristics as they approach the top of the hierarchy 107. Different users 103 of the system 100 will create different group hierarchies 107, consistent with the types of assemblies 104 that a particular user 103 or organization is typically concerned with.

FIG. 12 is an example of a table of characteristics shared by all components 108 in a particular group 120 of components 108. In the particular example, the group 120 is a body component group that includes the body component 200 of FIG. 11. Parts 114 in the group 120 (e.g. group characteristics) can have characteristics such as a face name 210, a description 212, an offset 214, and a rotation 216. The face name 210 refers to the mating location and type of mating location. The description 212 can be a description of the mating location, a description of characteristic, and/or a description of how the particular face 210 mates with other faces 210. The offset 214 field can define an offset with respect to the mating of the face 210. The rotation 216 field can define a particular face as being rotated from 0° to 360° with respect to the component 108. Other embodiments of the system 100 may include additional group characteristics. Some embodiments may include fewer characteristics, omitting for example, the offset 214 and rotation 216 fields. The system 100 is highly flexible and adaptable, and can support a wide variety of different group characteristics. Building block groups 120 can utilize different group characteristics than high level groups 120 within the same embodiment of the system 100. In some embodiments of the system 100, interaction with the CAD program or finite element analyzer will be used to determine which group characteristics are being used. For example, the CAD representation of a part 114 may determine which face names 210 are used by the system 100.

B. Relationships between Components

Figure 13:
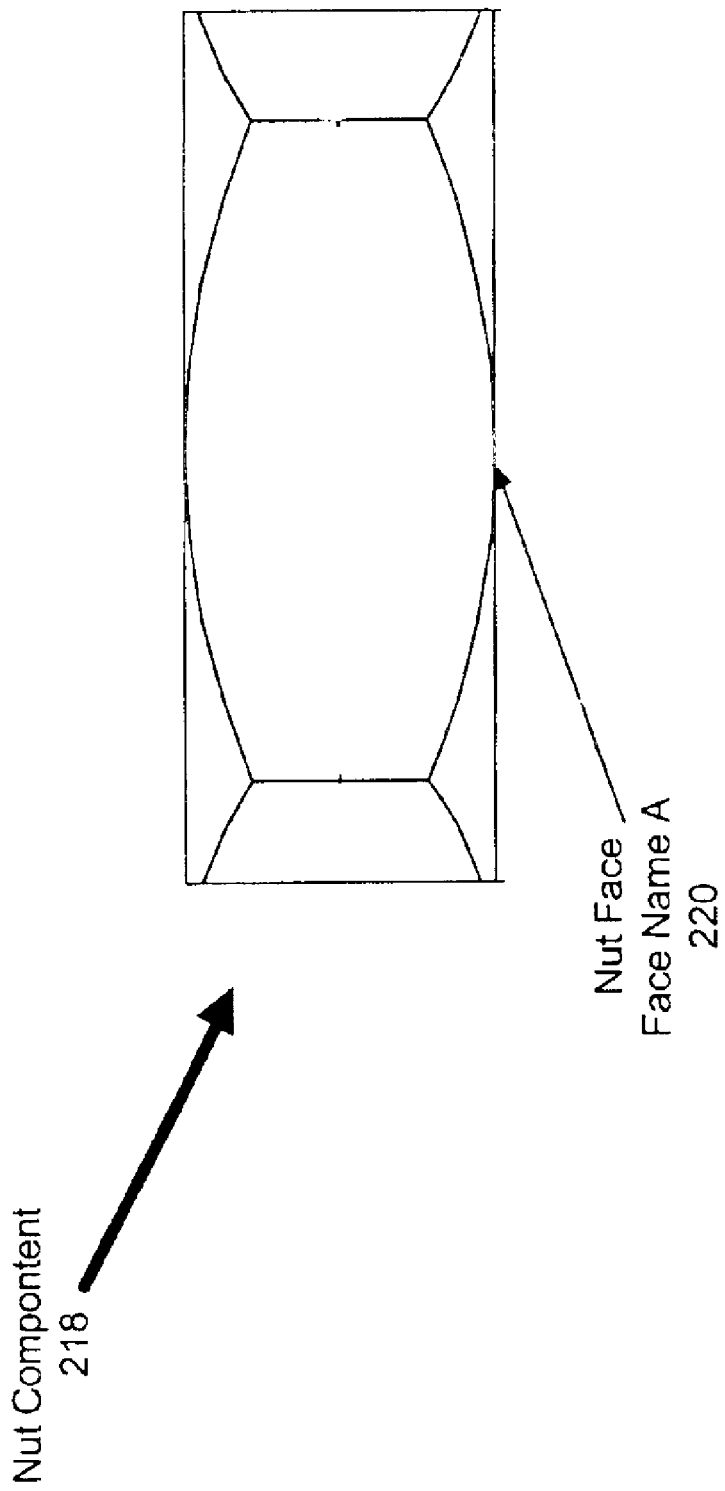
FIG. 13 is a component diagram illustrating an example of a mating characteristic.

FIG. 13 is an example of a component diagram that discloses a characteristic (a face) of a component 108 that can mate with the body component 200 disclosed in FIG. 11. FIG. 13 discloses a nut component 218 with a mating location of a nut face 220 with a face name of A. Other characteristics of the nut component 218 can include the radius of the nut, the height of the nut, the material composition of the nut, and any other potentially relevant component 108 characteristic. However, such additional characteristics are typically not relevant mating characteristics.

The nut face 220 in FIG. 13 can mate against the top of the lock nut seat 202 in FIG. 11. As discussed above, each part 114 can be stored in a "bucket" or group 120. So that the appropriate group 120 is selected by the system 100, each group 120 has a name. For example, the body component 200 of FIG. 11 can belong to the body component group or "bucket 100" and the nut 218 of FIG. 13 can belong to a nut group or "bucket 350." Additionally, each "bucket" can include a record of all the unique face names 210 located within, as disclosed in the example in FIG. 12.

Upon receipt of the BOM (bill of material) 124 by the system 100, the system 100 can call the parts 114. In some embodiments, each part 114 resides in only building block group 120 or bucket, and each building block group 120 or bucket has a record of all unique face names. In such embodiments, the calling out of a face name 210 can be accomplished as follows: <bucket name>/<face name>. For example, to call the bottom face of the nut 218 in FIG. 13, we could use the following notation "350/A."

C. Mating Relationship or Connection

With an identified "bucket" (e.g. building block group) 120 and "face" 210, the system 100 can pull the component 108 from the bucket 120. The component 108 pulled from the bucket 120 is determined by the BOM 124. A mating relationship can then be assigned between the two (or more) components 108. To mate the bottom of the nut 218 in FIG. 13 from bucket 350 to the top of a body component 200 in FIG. 11 from group 100, the system 100 stores the following notation: "100/D-mates→350/A."

Though simple, what does the above relationship really mean? The relationship (which can be referred to as a connection or a mating) states that in bucket 100, any part 114 that has a named face/surface of "D" is allowed to mate with any part 114 located in "bucket 350" that has a named face/surface of "A." In the example discussed above, it was stated that all body components 200 can be located within a single bucket, "bucket 100." It was also stated that a bucket or group 120 can have a record of all unique face/surface names 210. However, not every part 114 within the particular bucket 120 will have every face name 210. In a preferred embodiment, it is assumed that the BOM 124 provided to the system 100 is correct, so that the system 100 does not need to independently validate the list of components 101 provided in the BOM 124. In other embodiments, the system 100 can validate the BOM 124 or list of components 101 automatically without human intervention.

The system 100 can assemble parts 114 and other components 108 by identifying the building block groups 120 or buckets to which the components 108 belong, remembering that in a preferred embodiment, a particular component 108 can belong to only one building block group 120. In some embodiments of the system 100, the system 100 includes all of the functionality of a CAD tool within the system 100. In other embodiments of the system 100, the system 100 interfaces with a CAD tool to actually generate the assembly 104.

The CAD tool that is either interfaced with or incorporated into the system 100 can be used to determine the face 210 of a particular component 108 that has been identified as belonging to a particular building block group 120 through the BOM 124. Some CAD tools such as PRO/E will only allow unique names on a surface in a project, and these names are retrievable. For each of the components 108 in an assembly 104, face/surface names 210 can be pulled from the CAD tool. After the face/surface names 210 have been pulled from the CAD tool, the next step can be performed. A look-up with the CAD tool can be performed to determine what face(s) 210 the component 108 is allowed to mate with (a mating compatibility characteristic). The components 108 are mated and the process is repeated until all components 108 have been mated and the assembly 104 is complete.

D. Mating Rules or Mating Heuristics

The system 100 can apply a wide range of additional mating rules ("mating heuristic"). Some mating rules are general in nature, and can be incorporated into many system 100 embodiments. For example, as a general matter, parts 114 should be mated to other parts 114 (through a "subassembly mating heuristic") to make subassemblies 116 before subassemblies 116 are mated to other subassemblies 116 (through an "assembly mating heuristic"). Another example of a general mating heuristic would be configuring the system 100 so that spring connections are generated after non-spring connections. Similarly, the system 100 can be configured so that once a part surface 210 is mated to another part surface 210 (named face or datum plane), those mated surfaces are not subsequently allowed to mate to any additional surfaces. To allow for a given surface to mate to two different part surfaces, two separate surfaces can be defined on the given surface.

Other mating rules can be more assembly-specific. For example, in the situation of the body component 200 in FIG. 11 with the characteristics identified in FIG. 12, the inside lead seal (face A) of the body 200 should remain out of the assembly scheme until all other parts 114 have been mated, minus the springs. Mating rules can thus incorporate the particular characteristics and challenges relating to the goals of the user 103 and the assemblies 104 to be created.

Some mating rules originate from the nature of the components 108 themselves. For example, certain parts 114 such as springs and o-rings/seals typically require special attention. Special rules can be created for such components 108.

1. Spring Mating Heuristic

In some embodiments, springs will be handled on a "generic" basis. All spring properties can be located in the database 106, with the identifying feature being its part number. In some embodiments, all spring faces can be given the same name. In some embodiments, the BOM 124 can determine which springs are used within a particular assembly 104. In some embodiments, springs can be located to a surface 210 by both face (face matching heuristic) and diameter matching (diameter matching heuristic). In some embodiments, the spring is mated to one part face. The opposite end of the spring can then be drawn (with the diameter constrained) to meet the next contact point (surface on a part) based on that initial connection. In some embodiments, when a spring mates to a surface 210, the surface is hidden from other parts; however, other springs may mate to that same surface. The system 100 can be configured to support nested springs, or the system 100 can be configured to prevent nested springs.

Should an exception arise or a clarification be desirable, additional matching information for a given assembly 104, may be passed along in the BOM 124. For example, spring A and spring B can have similar properties for O.D. (outer diameter) and face name 210. If spring A mates to part X and spring B mates to part Y, this information could be called out in the BOM 124.

2. O-Ring Mating Heuristic

FIG. 14 is an example of an o-ring configuration matrix that can be incorporated into the system 100. O-rings and seals can be processed in ways that are not substantially different from the above naming conventions, however, there can be some additional required information.

The system 100 can identify an o-ring configuration with a configuration matrix. The configuration matrix in FIG. 14 can help illustrate the possible o-ring configuration types and their names (collectively "configurations" 222). There are typically two primary pieces of information to an o-ring configuration, cross-sectional size and configuration version. Size can be identified by one or more T designations 226, 228, 230, and 232 going from left to right and version can be defined by a SC (seal configuration) number 224 moving down the column second from the left. An o-ring configuration can always begin with the letters OR, identifying the o-ring group. A key 234 for the matrix can be used to link symbols used in the matrix with a more detailed written description.

Unlike other mating situations, o-rings can require a configuration 222 and a proper order (configuration order) for configuration 222. Defining the location can be as simple as placing a datum plane and adding a datum plane point (the "point") on the datum plane defining where the o-rings go. The point identifies where (north/south) on the datum plan the seals can be located. The point should be placed at the location of the o-ring groove. The system 100 can then mate the seal configuration to the face of the datum plane where no part interference will be caused, such as where a void in the drawing exists.

Figure 15:
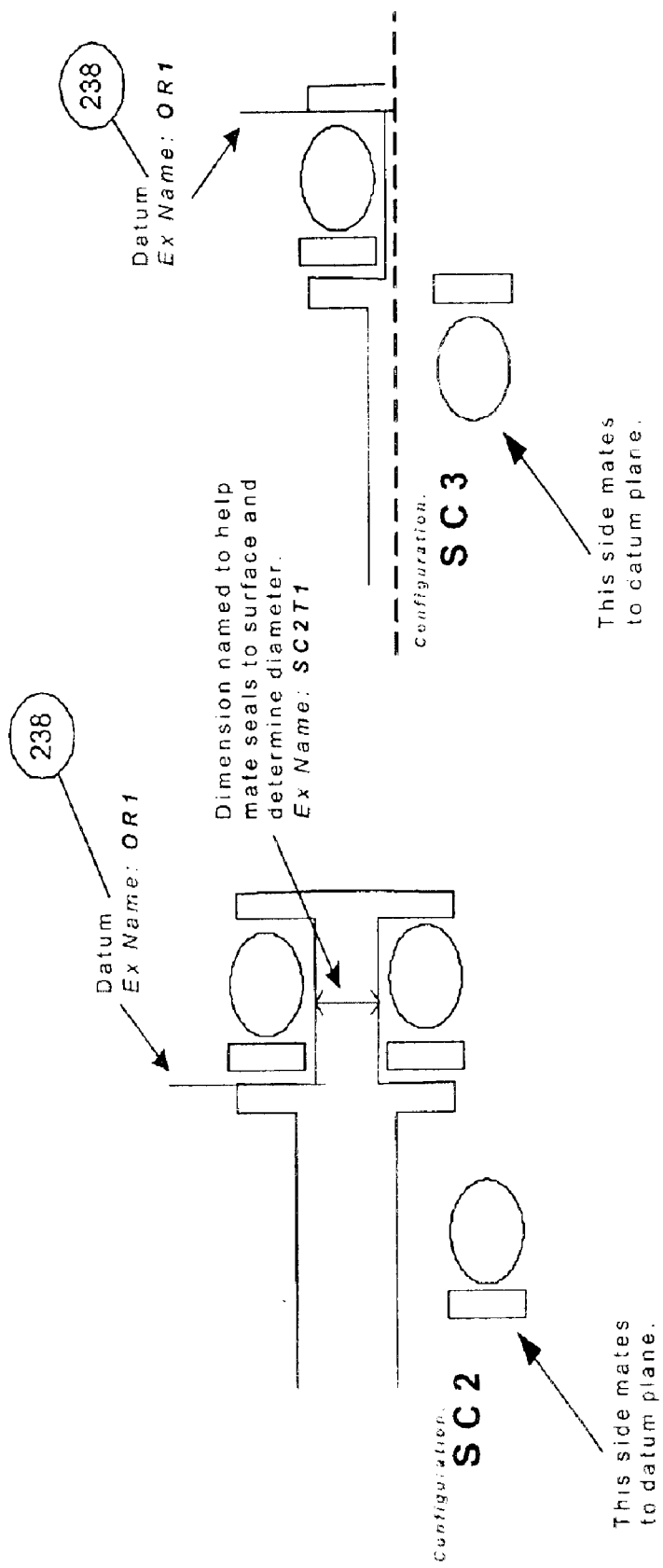
FIG. 15 is a component diagram illustrating an example of a datum plane that can be identified as the component characteristic of a face.

FIGS. 15 and 16 are component diagrams illustrating examples of a datum plane 238 that can be identified as the component characteristic of a face. In FIG. 15, the o-ring configuration 222 is mated to the datum plane 238 on an adjustment screw. The mating or connection can be referenced as follows: "325/OR1-mates→SC2T1."

Looking at an adjustment screw part 240 in FIG. 16, the top of the adjustment screw 240 is on the left, and the bottom of the adjustment screw on the right. The void is on the right-hand side of the datum plane 238. Using the above information, the backup ring can be placed against the face of the datum plane 238 (as visible in FIG. 16), with the o-ring being furthest away from the datum plane 238, or just to the right of the backup ring.

To move the datum plane 238 so that the void is on the left, the mating or connection could be changed to "325/OR1-mates→SC3T1." Because the seal configuration should typically be the same on a part 114, in a given assembly, the location of the datum plane 238 determines the SC configuration selected from the configuration table. The o-ring/seal closest to the datum plane should be the left-most part for a given SC configuration.

E. Mating Database Structures

A wide variety of different mating database structures can be incorporated in the database 106 utilized by the system 100. The database structure can be relatively simple, and is capable of being created, updated, and stored in formats such as a spreadsheet. However, in a preferred embodiment, a database is used to add, update, and delete mating characteristics.

1. Example of a Data Design

Figure 17A:
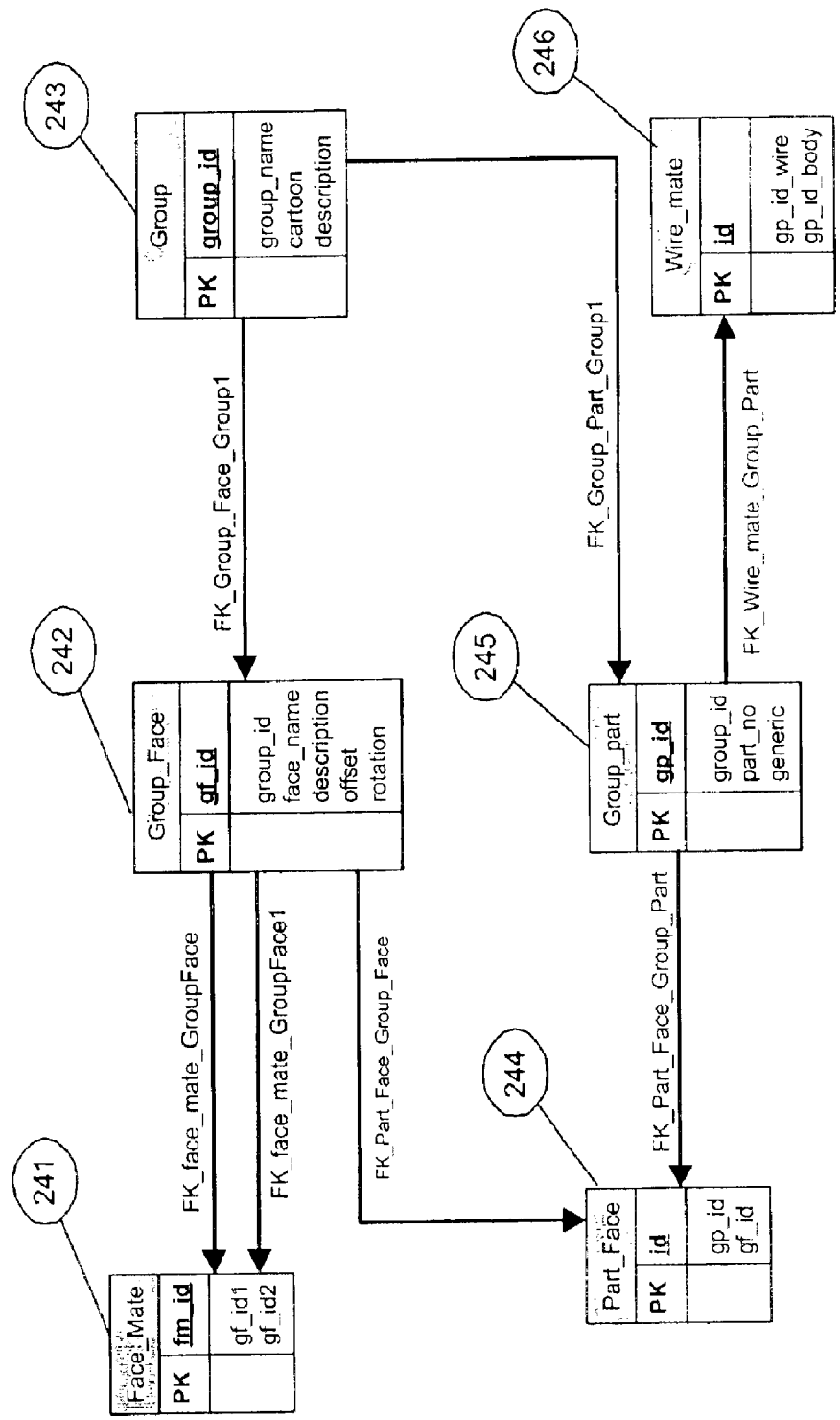
FIG. 17a is a data design diagram illustrating an example of a data design that can be used by the system to mate components together to create an assembly.

FIG. 17a is an example of a database design that can be used by the system 100 to mate components together to create an assembly 104. A Face_Mate table 241 can be used to store all of the potential mating relationships in the system 20. A particular face can potentially mate with more than one type of face, although some faces may be limited to only one mating possibility. Some face characteristics pertain to a particular group 120 while other faces are characteristics of components 108. Thus, a Group_Face table 242 is used to store relationships between the Face_Mate table 241 and the various groups stored in a Group table 243. In some embodiments, the Group table 243 can incorporate a hierarchy 107 of relationships between groups 120.

Similarly, a Part_Face table 244 can be used to store relationships between the Face_Mate table and a particular part 114. A Group_Part table 245 is used to store parts 114 information. In the example illustrated in FIG. 17a, each part 114 belongs to a group 120, although a particular group 120 can be as small as only one part 114. In a preferred embodiment, a part 114 can belong to only one building block group 120, but the building block group can itself belong to one or more high level groups 120.

As discussed above, different uses of the system 100 may require different data storage configurations. In the example in FIG. 17a, a separate table is used for mating a wire to a body. A Wire_Mate table 246 is used to store those special designated mating relationships. In other embodiments, different specially designated mating relationships may exist. In some of those embodiments, even special categories of mating relationships can be stored in the Face_Mate table 241, with extra columns being added to that table in order to facilitate exception-based processing. As discussed above, the mating heuristics applied by the system 100 may require that certain types of connections be created in a particular order. By creating special columns or entirely new database tables to store those special relationships, the system 100 can be configured to meet different user 103 demands.

A wide variety of different database structures can be incorporated into the system 100. The example in FIG. 17a is normalized, with separate tables being used to store group membership, group mating faces, and relationships between mating faces. In embodiments utilizing complex group hierarchies 107 and/or assembly hierarchies 109, additional tables can be used to track membership, faces, and face mating relationships at the different levels (e.g. building block groups vs. high level groups, etc.) in the various hierarchies. Such an embodiment of the system 100 can be referred to as hyper-normalized or super-normalized embodiment.

2. Example of a Data Relationship Chart

FIG. 17b is a data relationship chart that corresponds to some the data design in the example in FIG. 17a. In italics are listed potential foreign keys for database tables. For example, Fk_Face_Mate_Group_Face represents foreign keys on a Face_Mate_Group_Face table. The key fields in the Face_Mate table 241 (key field GF_id1) and the Group_Face table 242 (key field Gf_id) would be foreign keys on the Face_Mate_Group_Face table. Some other potential foreign key/database table relationships are listed in the chart for the purpose of illustration.

3. Example of a Data Dictionary

FIG. 17c is an example of a data dictionary for the example of a data design disclosed in FIG. 17a. The various column names, data types, and field descriptions are listed in the Figure as non-limiting examples of the types of data fields and data relationships that can be incorporated into the system 100.

4. Example of Interplay between Mating Process and Data Design

Figure 17D:
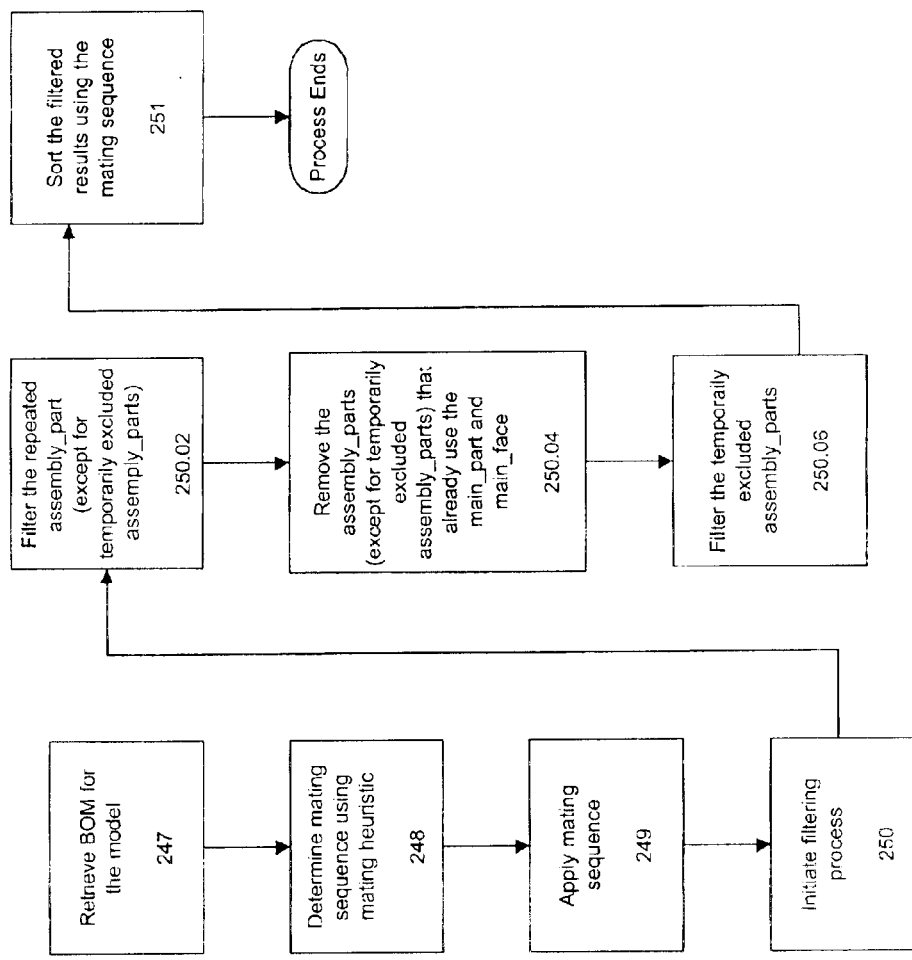
FIG. 17d is a flow chart illustrating some examples of the mating process.

FIG. 17d discloses an example of a flow chart illustrating one way in which an assembly 104 can be created from a bill of material 124.

At 247, the list of components 101 (preferably a bill of material (BOM) 124 is accessed by the system 100. For the purpose of this example, the BOM 124 in FIG. 18 is received by the system 100.

At 248, the system 100 determines the mating sequence using the mating heuristic, as discussed above. In terms of the example, it is determined by the system 100 that the sleeve must be assembled first.

At 249, the mating sequence can be applied. For the purposes of the example, the various relationships are retrieved first for the sleeve (a subassembly 116, and then the parts 114 that assemble on the sleeve. Then the same cycle is performed with the parts 114 that have already been assembled. The parts 114 for which relations are being retrieved should preferably be in the BOM 124. Otherwise, additional pre-validation processing can be performed.

At 250, the filter process is invoked by the system 100. In a preferred embodiment, this can be performed automatically and without human intervention.

At 250.02, the repeated assembly parts are filtered, except for those assembly parts that are temporarily excluded due to the mating heuristic of the system 100. In the example below, the repeated assembling_parts are filtered except for those relating to wire (a temporarily excluded part). All of the repeated assembling_parts except are selected except for the 400's group. If the Main_part and Main_face are already used, then the assembling_part is deleted Table A is an example of 250.02 process from a BOM 124 of the CWCL assembling_part 126-601-011_ that is disclosed in FIG. 18.

TABLE A

| assembling_part | assembling_Face | Main_part | Main_face | Sub_asm |
|---|---|---|---|---|
| 230-178 | NULL | NULL | NULL | NULL |
| 126-601-011 | 100A | 230-178 | 230A | CWCL |
| 400-001-005 | 400A | 230-178 | 230H | CWCL |
| 400-002-002 | 400A | 230-178 | 230H | CWCL |
| 400-002-007 | 400A | 230-178 | 230H | CWCL |
| 460-005 | 460A | 230-178 | 230A | CWCL |
| 270-005 | 270A | 126-601-011 | 100E | CWCL |
| 325-059 | 325A | 126-601-011 | 100C | CWCL |
| 350-003 | 350A | 126-601-011 | 100D | CWCL |
| 350-003 | 350H | 126-601-011 | 100D | CWCL |
| 400-001-005 | 400A | 126-601-011 | 100M | CWCL |
| 400-002-002 | 400A | 126-601-011 | 100M | CWCL |
| 400-002-007 | 400A | 126-601-011 | 100M | CWCL |
| 250-145 | 250H | 400-002-007 | 400B | CWCL |
| 250-143 | 250G | 460-005 | 460B | CWCL |
| 400-001-005 | 400A | 325-059 | 325E | CWCL |
| 400-002-002 | 400A | 325-059 | 325E | CWCL |
| 400-002-007 | 400A | 325-059 | 325E | CWCL |
| 800-001-040 | 800A | 325-059 | 325B | CWCL |
| 230-238 | 230F | 250-143 | 250A | CWCL |
| 240-162 | 240B | 250-143 | 250B | CWCL |
| 240-184 | 240B | 250-143 | 250B | CWCL |
| 220-018 | 220C | 800-001-040 | 800B | A220-018 |
| 126-601-011 | 100A | 230-238 | 230M | CWCL |
| 250-143 | 250B | 230-238 | 230C | CWCL |
| 250-225 | 250B | 230-238 | 230C | CWCL |
| 260-059 | 260D | 240-162 | 240A | CWCL |
| 240-162 | 240B | 240-184 | 240L | CWCL |
| 800-001-040 | 800A | 240-184 | 240C | CWCL |
| 240-162 | 240B | 250-225 | 250B | CWCL |
| 240-184 | 240B | 250-225 | 250B | CWCL |

The system 100 checks to see if the Main_part and Main_face are used. If they are used for a particular assembling_part, then that assembling part is deleted. In this example for 126-601-011 assembling_part <460-005> has used the Main_part <230-178> and Main_face <230A>, so it is deleted.

At 250.04, all of the repeated assembling_parts are selected except for those in the 400 group. If the Main_part and Main_face are already used in the assembling_part and assembling_face then we delete the assembling_part. Table B is an example of the 250.04 process using the CWCL assembling_part 240-184 from the BOM 124 in FIG. 18.

TABLE B

| assembling_part | Assembling_Face | Main_part | Main_face | Sub_asm |
|---|---|---|---|---|
| 230-178 | NULL | NULL | NULL | NULL |
| 400-001-005 | 400A | 230-178 | 230H | CWCL |
| 400-002-002 | 400A | 230-178 | 230H | CWCL |
| 400-002-007 | 400A | 230-178 | 230H | CWCL |
| 460-005 | 460A | 230-178 | 230A | CWCL |
| 270-005 | 270A | 126-601-011 | 100E | CWCL |
| 325-059 | 325A | 126-601-011 | 100C | CWCL |
| 350-003 | 350H | 126-601-011 | 100D | CWCL |
| 400-001-005 | 400A | 126-601-011 | 100M | CWCL |
| 400-002-002 | 400A | 126-601-011 | 100M | CWCL |
| 400-002-007 | 400A | 126-601-011 | 100M | CWCL |
| 250-145 | 250H | 400-002-007 | 400B | CWCL |
| 250-143 | 250G | 460-005 | 460B | CWCL |
| 400-001-005 | 400A | 325-059 | 325E | CWCL |
| 400-002-002 | 400A | 325-059 | 325E | CWCL |
| 400-002-007 | 400A | 325-059 | 325E | CWCL |
| 800-001-040 | 800A | 325-059 | 325B | CWCL |
| 230-238 | 230F | 250-143 | 250A | CWCL |
| 240-184 | 240B | 250-143 | 250B | CWCL |
| 220-018 | 220C | 800-001-040 | 800B | A220-018 |
| 126-601-011 | 100A | 230-238 | 230M | CWCL |
| 250-225 | 250B | 230-238 | 230C | CWCL |
| 260-059 | 260D | 240-162 | 240A | CWCL |
| 240-162 | 240B | 240-184 | 240L | CWCL |
| 800-001-040 | 800A | 240-184 | 240C | CWCL |
| 240-184 | 240B | 250-225 | 250B | CWCL |

The system 100 can then check to see if the Main_part and Main_face are used in assembling_part and assembling_face. If the assembling_part is used, the system 100 can delete the assembling_part. In this case for 240-184, the Main_part and Main_face <250-225> has used the assembling_part and assembling_face, and so the system 100 can delete 240-184.

At 250.06, the temporarily excluded assembly_parts (in this case the 400 group) can be filtered. The system 100 can thus select each assembling_part and main_part belonging to the 400 group. For this particular embodiment, some component-specific mating rules have been entered into the Wire_Mate table 246 for 400 group and written in a view name of VIEW_Wire_Mate 400-002-002 mates with 126.

TABLE C

| assembling_part | Assembling_Face | Main_part | Main_face | Sub_asm |
|---|---|---|---|---|
| 230-178 | NULL | NULL | NULL | NULL |
| 400-001-005 | 400A | 230-178 | 230H | CWCL |
| 400-002-002 | 400A | 230-178 | 230H | CWCL |
| 400-002-007 | 400A | 230-178 | 230H | CWCL |
| 460-005 | 460A | 230-178 | 230A | CWCL |
| 270-005 | 270A | 126-601-011 | 100E | CWCL |
| 325-059 | 325A | 126-601-011 | 100C | CWCL |
| 350-003 | 350H | 126-601-011 | 100D | CWCL |
| 400-001-005 | 400A | 126-601-011 | 100M | CWCL |
| 400-002-002 | 400A | 126-601-011 | 100M | CWCL |
| 400-002-007 | 400A | 126-601-011 | 100M | CWCL |

TABLE C-continued

| assembling_part | Assembling_Face | Main_part | Main_face | Sub_asm |
|---|---|---|---|---|
| 250-145 | 250H | 400-002-007 | 400B | CWCL |
| 250-143 | 250G | 460-005 | 460B | CWCL |
| 400-001-005 | 400A | 325-059 | 325E | CWCL |
| 400-002-002 | 400A | 325-059 | 325E | CWCL |
| 400-002-007 | 400A | 325-059 | 325E | CWCL |
| 800-001-040 | 800A | 325-059 | 325B | CWCL |
| 230-238 | 230F | 250-143 | 250A | CWCL |
| 240-184 | 240B | 250-143 | 250B | CWCL |
| 220-018 | 220C | 800-001-040 | 800B | A220-018 |
| 126-601-011 | 100A | 230-238 | 230M | CWCL |
| 250-225 | 250B | 230-238 | 230C | CWCL |
| 260-059 | 260D | 240-162 | 240A | CWCL |
| 240-162 | 240B | 240-184 | 240L | CWCL |
| 800-001-040 | 800A | 240-184 | 240C | CWCL |

The system 100 can then determine whether 400-002-002 exists with a main_part other than 126-XXX. If such a component 108 exists, then the result can be deleted. In this example, <230-178, 325-059> can be deleted.

| 400-002-002 | 400A | 230-178 | 230H | CWCL |
|---|---|---|---|---|
| 400-002-002 | 400A | 325-059 | 325E | CWCL |

At 251, the filtered results can be sorted to get the proper assembly sequence. The sequence starts with the sleeve followed by the parts 114 that assemble on the sleeve. Then the same cycle continues with the parts 114 that have been already assembled. In some embodiments, the mating sequence (the sequence by which faces are paired off) and the assembly sequence (the sequence by which components 108 are actually assembled) are the same. In other embodiments, there can be differences between the various sequences.

F. Bill of Material

The system 100 can utilize intelligence built into the definition of components 108 and groups 120 to efficiently build assemblies 108. The structure of the list of components 101 can play an important part of the system 100. Thus, a bill of materials 124, especially a validated bill of materials 124 or a pre-validated bill of materials 124, can be useful for the purposes of system 100 processing. The BOM 124 can be a well-formatted list of components 101 needed to build the assembly 104 and ultimately, the physical assembly.

FIG. 18 is an example of bill of material 124 that could be used by the system to automatically generate an assembly 104. The bill of materials 124 can include a common part portion 256 and an option part portion 258. The bill of materials 124 can also include one or more subassembly callouts 260, disclosing some or all aspects of the assembly hierarchy 109 discussed above. The BOM 124 can include a wide variety of different fields, such as component number, component name, quantity, option codes, and any other potentially relevant field.

The BOM 124 can be pulled from the database 106 using a wide variety of different mechanisms, such as an SQL stored procedure, XML, or some other format of database interaction (collectively "stored procedure"). In such embodiments, the database 106 can be integrated with the CAD tool that is either incorporated into or interfaced with by the system 100. FIGS. 19 and 20 are examples of a BOMs 124 that can be pulled from the database 106 using an XML stored procedure.

The stored procedure can be configured to accept a wide variety of different parameters. In the following example, the procedure accepts a model and an extension to identify the desired assembly 104: "up_proe (sModel, sExtension)." The "sModel" parameter can be used to identify the general category of assembly 104, while the "sExtension" parameter can be used to identify the specific assembly 104 within the general category. Wildcards such as "*" can also be used within the parameters.

The BOM 124 can include assemblies 116, and those subassemblies are themselves capable of including subassemblies 116, in accordance with the assembly hierarchy 109 disclosed and described in FIG. 2. In the examples in FIGS. 19 and 20, "part" numbers for sub-assemblies 116 and other non-part components begin with the letter A.

Because speed is an issue, model caching can be incorporated into the system 100. To enable this, the BOM 124 can provide information in addition to the part or component number. Additional information can include: a BOM time/date stamp (preferably located in the database 106), a CAD part change time/date stamp, and a model last constructed time/date stamp (preferably located in the database 106).

When a model drawing is requested by the user 103, each part time/date stamp will be compared to the construction time/date stamp and the construction time/date stamp compared with the BOM 124 time/date stamp. Should any of those time/date stamps be more recent then the model construction time/date stamp, the model will be re-assembled. If not, the cached constructions are retrieved and displayed to the user 103.

This cached model idea can bring with it the ability to keep information up to date without human intervention or input. When a change is made to the BOM 124, the system 100 can update the BOM time/date stamp. The system 100 can also track changes to a CAD drawn part or the part residing in a directory or CAD file.

G. Assembly Instructions

One function of the system 100 can be to generate the assembly 104 in an electronic format, such as a CAD drawing, a computer model, or some similar format or representation. However, such electronic or "virtual" assemblies 104 can also include assembly instructions relating to the physical assembly. Those instructions can be used by automated tools to build physical assemblies without human intervention.

Assembly instructions, used during the manufacturing process, may be linked to a part 114, subassembly 116, model family, model assembly, group, or some other category of structures or components 108. The functional layout of this can be similar to how features/descriptions are handled in the database 106.

The administration of assembly instructions can be setup similar to and as part of component/component characteristic administration in the database 106. The "enter once use many" concept is to be used whenever possible. Assembly instructions can be separated into several categories, such as Family; Assembly; Parts General; and Parts By Grouping. Other embodiments may utilize more categories, fewer categories, and/or different categories. Family refers to a classification of related assemblies. Assembly refers to a particular assembly 104. Parts General refers to components generally. Parts By Grouping refers to part groups or building block groups 120.

Users 103 accessing the assembly subsystem 180 or manufacturing subsystem 140 can add new instructions, edit existing instructions, delete existing instructions that are not attached to any models (as defined in the different classifications above), view models where an instruction is attached, and view instruction history.

Just as the system 100 can apply categories (similar to object-oriented design techniques for software applications) to components 108 and groups 120, such approaches can also be used with respect to assembly instructions. Instructions can be linked to various categories of models, preferably using a graphical user interface.

H. Manufacturing Prints

Manufacturing prints often exist in the form of a 2-D drawing. BOM 124 breakouts for many assemblies involving subassemblies compressed onto an 8½×11 inch piece of paper. These drawings are difficult to read, especially for a new employee, and are sometimes confusing because they are compressed with so much information.

The terms Manufacturing Prints, is only being used to describe the information to be received by the assembly tables. Manufacturing Prints can be available in two formats—print and on-screen—and can include the following pieces:

2-D, ¼ section cut of the assembled model
3-D, ½ section cut of an partially exploded assembly
Clickable BOM of assembly
Assembly Instructions:
   Assembly Specific (7-ltr)
   Model Specific (⅘-ltr)
   Part Specific
3-D part image, BOM activated VII. Additional Alternative Embodiments While the invention has been specifically described in connection with certain specific embodiments thereof, it is to be understood that this is by way of illustration and not of limitation, and the scope of the appended claims should be construed as broadly as the prior art will permit.

What is claimed is:

1. A system for automatically generating an assembly from a list of components, comprising:
an input subsystem configured to receive a list of components, wherein said list of components includes a plurality of components;
a grouping subsystem, including a plurality of groups, wherein each group in said plurality of groups comprises a group characteristic shared by each component in said group, and wherein each component in said plurality of components belongs to at least one group; and
a mating subsystem, including a relationship between at least two components in said plurality of components, wherein said mating subsystem provides for generating said relationship with said group characteristic, and wherein said assembly is a finite element model readable by a CAD tool.

2. The system of claim 1, wherein said list of components is a pre-validated bill of material, wherein said pre-validated bill of material comprises a plurality of component identifiers and a component hierarchy characteristic, and wherein said pre-validated bill of material does not include a mating characteristic.

3. The system of claim 2, wherein said pre-validated bill of materials does not specify said assembly.

4. The system of claim 2, further comprising a plurality of said relationships between said plurality of parts, wherein said pre-validated bill of materials does not define said relationships.

5. The system of claim 1, wherein said plurality of components comprises a first subassembly, a second subassembly, and a part, wherein said second subassembly includes said part, and wherein first subassembly includes said second subassembly.

6. The system of claim 1, wherein said plurality of components comprises a first subassembly, a second subassembly, a plurality of first parts, and a second part, wherein said first subassembly includes said first part and said second part, and wherein said second subassembly includes said first part and does not include said second part.

7. The system of claim 6, wherein said plurality of components further comprises a third subassembly, wherein said third subassembly includes said first subassembly and said second subassembly.

8. The system of claim 1, wherein said plurality of groups comprises a first group and a second group, wherein said first group includes said second group.

9. The system of claim 1, wherein each group in said plurality of component groups comprises a plurality of group characteristics, said plurality of group characteristics including a face and mating compatibility, wherein said face influences said mating compatibility.

10. The system of claim 9, wherein said mating compatibility allows only one compatible mating possibility within said assembly.

11. The system of claim 1, wherein said mating subsystem further includes a mating heuristic, a component database record, and a mating sequence, wherein said mating subsystem generates said mating sequence with said mating heuristic and said component database record.

12. The system of claim 11, said mating heuristic comprising an assembly mating heuristic and a subassembly mating heuristic, wherein said subassembly mating heuristic is performed before said assembly mating heuristic is performed.

13. The system of claim 1, said mating subsystem further including a spring connection and a non-spring connection, wherein said spring connection is generated after said non-spring connection.

14. The system of claim 1, said mating subsystem further including an alternative mating possibility, wherein said mating subsystem generates said alternative mating possibility, and wherein said alternative mating possibility is influenced by said group characteristic.

15. The system of claim 14, said mating subsystem further including a plurality of alternative mating possibilities, wherein said mating subsystem selectively identifies said connection from said plurality of alternative mating possibilities.

16. The system of claim 1, further comprising subassembly rule, a subassembly, and a part mating determination, wherein said mating subsystem generates said part mating determination for said subassembly with said subassembly rule.

17. The system of claim 1, further comprising an assembly rule, an assembly, and a subassembly mating determination, wherein said mating subsystem generates said subassembly mating determination for said assembly with said assembly rule.

18. The system of claim 1, further comprising a diameter checking heuristic, wherein said mating subsystem generates said relationship with said diameter checking heuristic.

19. The system of claim 1, further comprising a drawing subsystem, wherein said drawing subsystem generates a drawing of an assembly from said relationship without human intervention and wherein said drawing subsystem formats said drawing.

20. The system of claim 1, further comprising a manufacturing instruction relating to at least one said component in said plurality of components, wherein said relationship includes said manufacturing instruction.

21. The system of claim 20, further comprising an automated manufacturing subsystem, wherein said automated manufacturing subsystem manufactures said assembly with said manufacturing instruction.

22. The system of claim 1, wherein said assembly is a 3D representation.

23. The system of claim 1, wherein said components are not assigned to a pre-defined location.

24. A system for automatically generating a CAD drawing of an assembly from a bill of material, comprising:
- a bill of material including a plurality of components, wherein said plurality of components includes a plurality of parts and a plurality of subassemblies, wherein each subassembly in said plurality of subassemblies comprises at least two parts from said plurality of parts;
- a component database, including a plurality of groups and a plurality of mating characteristics, wherein each group in said plurality of groups comprises a mating characteristic shared by each component in said group, and wherein each component in said plurality of components belongs to at least one group; and
- a mating tool, including a plurality of connections between components in said plurality of components, said plurality of connections comprising a part connection between at least two parts in said plurality of parts, and a subassembly connection between at least two subassemblies In said plurality of subassemblies, wherein said mating tool generates said plurality of connections with said plurality of mating characteristics, and wherein said assembly is a finite element model capable of being modified by a CAD tool.

25. The system of claim 24, said plurality of mating characteristics comprising a first group including a first mating compatibility and a second group including a second mating compatibility, wherein said connection between said first group and said second group depends on said first mating compatibility and said second mating compatibility.

26. The system of claim 24, wherein said component database includes a plurality of component drawings, wherein each said component in said component database is associated with at least one said component drawing.

27. The system of claim 24, wherein said assembly is created in a dynamic manner.

28. A method for automatically generating a CAD model from a list of component identifiers without human intervention, comprising:
- inputting a plurality of components, groups, and mating rules into a database;
- configuring an input device to receive a list of component identifiers;
- programming a computational device to automatically generate a CAD model from said list component identifiers with said database.

29. The method of claim 28, further comprising receiving a bill of materials and dynamically generating said CAD model with said database.

* * * * *